(12) United States Patent
Cha

(10) Patent No.: US 10,920,880 B2
(45) Date of Patent: Feb. 16, 2021

(54) AUTOMOTIVE TRANSMISSION

(71) Applicant: SL Corporation, Daegu (KR)

(72) Inventor: Hongjun Cha, Daegu (KR)

(73) Assignee: SL Corporation, Daegu (KR)

( * ) Notice: Subject to any disclaimer, the term of this patent is extended or adjusted under 35 U.S.C. 154(b) by 106 days.

(21) Appl. No.: 16/190,544

(22) Filed: Nov. 14, 2018

(65) Prior Publication Data

US 2019/0145514 A1 May 16, 2019

(30) Foreign Application Priority Data

Nov. 16, 2017 (KR) .......................... 10-2017-0153240

(51) Int. Cl.
| | | |
|---|---|---|
| *F16H 59/10* | (2006.01) | |
| *F16H 61/24* | (2006.01) | |
| *F16H 59/02* | (2006.01) | |

(52) U.S. Cl.
CPC ............. *F16H 61/24* (2013.01); *F16H 59/10* (2013.01); *F16H 2059/026* (2013.01); *F16H 2061/243* (2013.01); *F16H 2061/247* (2013.01)

(58) Field of Classification Search
CPC .... F16H 61/24; F16H 59/10; F16H 2059/026; F16H 2061/243; F16H 2061/247
See application file for complete search history.

(56) References Cited

U.S. PATENT DOCUMENTS

| | | | | |
|---|---|---|---|---|
| 1,743,241 A | * | 1/1930 | Schmidt ................. | B60K 20/02 74/473.33 |
| 4,073,199 A | * | 2/1978 | Simons .................. | B60K 20/04 180/328 |
| 6,029,535 A | * | 2/2000 | Kenny ................ | F16H 59/0278 403/349 |
| 6,564,661 B2 | * | 5/2003 | DeJonge ................ | B60K 37/06 74/335 |
| 6,601,685 B2 | * | 8/2003 | Nagasaka .............. | B60K 37/06 192/218 |
| 6,889,812 B2 | * | 5/2005 | Wendeberg ............ | B60K 20/02 192/219.4 |

(Continued)

FOREIGN PATENT DOCUMENTS

| | | | | |
|---|---|---|---|---|
| JP | 2000085397 A | * | 3/2000 | |
| JP | 2006160098 A | * | 6/2006 | |

(Continued)

*Primary Examiner* — Jake Cook
*Assistant Examiner* — Gregory Robert Weber
(74) *Attorney, Agent, or Firm* — Nelson Mullins Riley & Scarborough LLP; Kongsik Kim, Esq.

(57) ABSTRACT

Provided is an automotive transmission, and more specifically, an automotive transmission that prevents the occurrence of unnecessary handling feedback when a gear shift lever is operated. The automotive transmission includes a gear shift lever, a rotation unit configured to rotate together with the gear shift lever, a first gear unit disposed at a first side of the rotation unit to be rotated around a rotation axis of the rotation unit together with the rotation unit, a second gear unit configured to switch between a coupled position, at which the second gear unit is coupled to the first gear unit, and a separated position, at which the second gear unit is separated from the first gear unit, and a driving unit configured to change a position of the second gear unit and provide a driving force to the second gear unit.

17 Claims, 31 Drawing Sheets

(56) References Cited

U.S. PATENT DOCUMENTS

| | | | | |
|---|---|---|---|---|
| 8,601,896 | B2 * | 12/2013 | Skogward | B60K 20/04 74/473.3 |
| 10,711,883 | B2 * | 7/2020 | Keenan | B60N 2/773 |
| 2007/0204718 | A1 * | 9/2007 | Strait | G05G 5/06 74/523 |
| 2018/0244151 | A1 * | 8/2018 | Keenan | B60N 2/797 |

FOREIGN PATENT DOCUMENTS

| | | | | |
|---|---|---|---|---|
| JP | 2014156153 | A | * | 8/2014 |
| KR | 20130063830 | A | * | 6/2013 |

* cited by examiner

AUTOMOTIVE TRANSMISSION

This application claims priority from Korean Patent Application No. 10-2017-0153240 filed on Nov. 16, 2017, the disclosure of which is incorporated herein by reference in its entirety.

BACKGROUND

1. Field of the Disclosure

The present disclosure relates to an automotive transmission, and more specifically, to an automotive transmission that prevents the occurrence of unnecessary handling feedback when a gear shift lever is operated.

2. Description of the Related Art

A transmission has a varying gear ratio to maintain rotation of an engine constant based on the speed of a vehicle, and a driver adjusts the gear ratio of a transmission by operating a gear shift lever. Examples of a gear shift mode of the transmission include a manual gear shift mode in which the driver adjusts a gear shift stage and include an automatic gear shift mode in which, when the driver selects a driving stage, the gear shift stage is automatically adjusted based on the speed of the vehicle.

In addition, a sport mode type transmission is also used, which is capable of performing manual gear shift and automatic gear shift together. The sport mode type transmission includes, in a single transmission, a transmission that is capable of performing manual gear shift by allowing the driver to select the gear shift stage, and placed beside a transmission that is generally performing automatic gear shift.

The gear shift lever is placed to be exposed to an inside of the vehicle to allow the driver to adjust the gear shift stage, and handling feedback is provided when the gear shift lever is operated so that the driver can recognize gear shift operation. Recently, when driving of the vehicle is terminated, when ignition of the vehicle is stopped in gear shift stages other than a parking stage due to the driver's carelessness, a function is provided to prevent the possibility of occurrence of a vehicle accident in advance by returning the gear shift lever automatically to a position of the parking stage so that, when the driver operates the vehicle again, the driver can more easily recognize a current gear shift stage.

When the gear shift lever is automatically returned to the position of the parking stage, since the vehicle is not driven, unnecessary noise or abrasion occurs by the handling feedback. Thus, a means is required to prevent unnecessary handling feedback when the gear shift lever is operated and to prevent noise or abrasion.

SUMMARY

Aspects of the present disclosure provide an automotive transmission that is capable of preventing noise or abrasion by preventing the occurrence of unnecessary handling feedback. It should be noted that objects of the present disclosure are not limited to the above-described objects, and other objects of the present disclosure will be apparent to those skilled in the art from the following descriptions.

To achieve the above objects, an automotive transmission according to an exemplary embodiment of the present disclosure may include a gear shift lever, a rotation unit configured to rotate together with the gear shift lever, a first gear unit disposed at a first side of the rotation unit to be rotated around a rotation axis of the rotation unit together with the rotation unit, a second gear unit configured to switch between a coupled position, at which the second gear unit is coupled to the first gear unit, and a separated position, at which the second gear unit is separated from the first gear unit, and a driving unit configured to change a position of the second gear unit and provide a driving force to the second gear unit.

Other details of the present disclosure are included in the detailed description and drawings.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION

Figure 1:
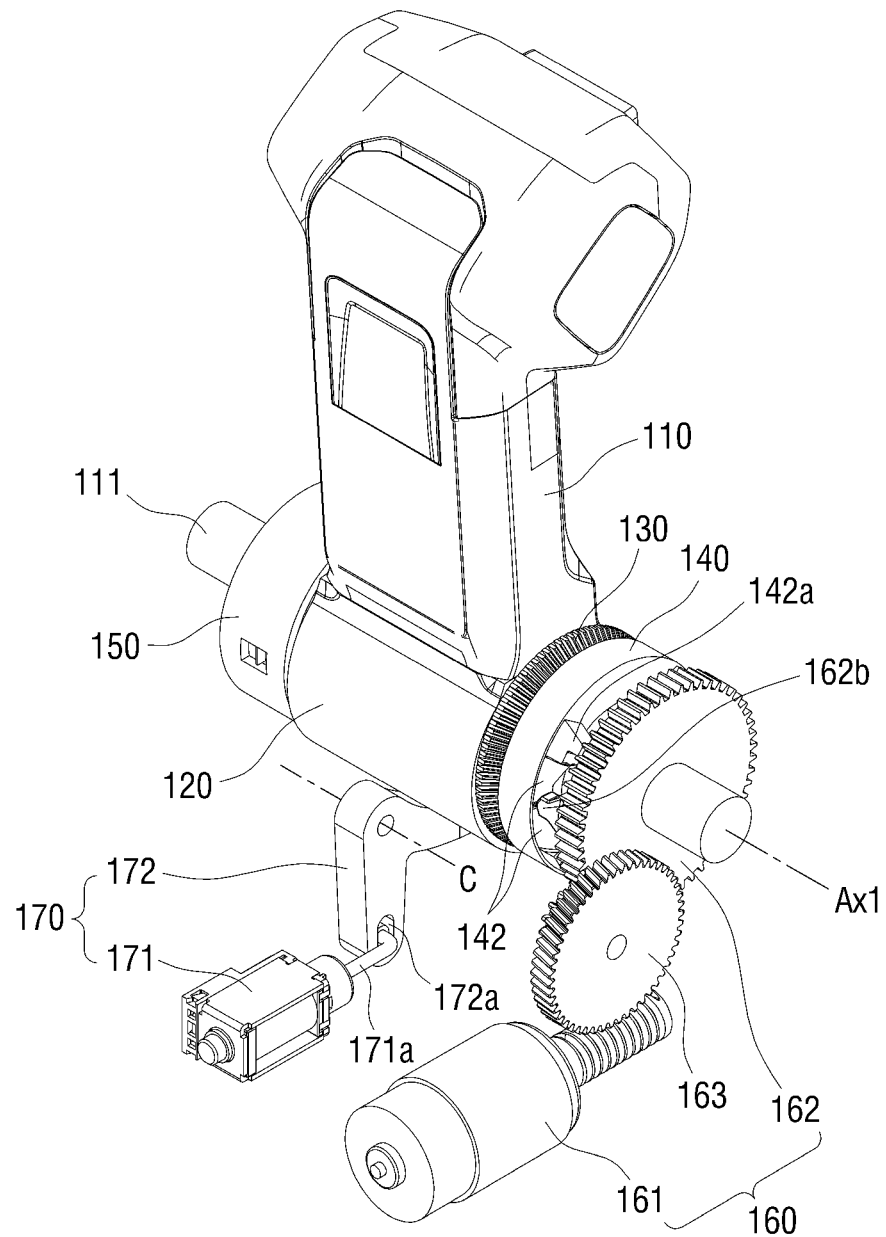
FIGS. 1 to 3 are perspective views for illustrating an automotive transmission according to an exemplary embodiment of the present disclosure.

Advantages and features of the present disclosure and methods of achieving them will be made clear by referring to exemplary embodiments described below together with the appended drawings. However, the present disclosure is not limited to the following exemplary embodiments but can be embodied in various different forms, and the present exemplary embodiments are provided so that the present disclosure is complete and the scope of the present disclosure is fully informed to those skilled in the art, and the present disclosure is defined by the scope of the claims. Like reference numerals throughout the specification represent like elements.

Thus, in some exemplary embodiments, well-known process steps, well-known steps, and well-known technologies may not be described in detail to avoid the present disclosure being ambiguously interpreted.

The terminology used herein is for the purpose of describing particular exemplary embodiments only and is not intended to be limiting to the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Also, exemplary embodiments to be described in the present specification will be described with reference to a perspective view, a cross-sectional view, a side view, and/or schematic views, which are ideal illustrative drawings of the present disclosure. Thus, shapes of illustrative drawings may be modified due to fabrication technologies and/or allowable tolerances. Thus, the exemplary embodiments of the present disclosure are not limited to specific forms but include a variety of shapes formed according to a fabrication process. Also, elements in the drawings may be slightly enlarged or reduced in consideration of convenience of explanation.

Hereinafter, the present disclosure will be described with reference to the accompanying drawings to explain an automotive transmission according to some exemplary embodiments of the present disclosure.

Figure 2:
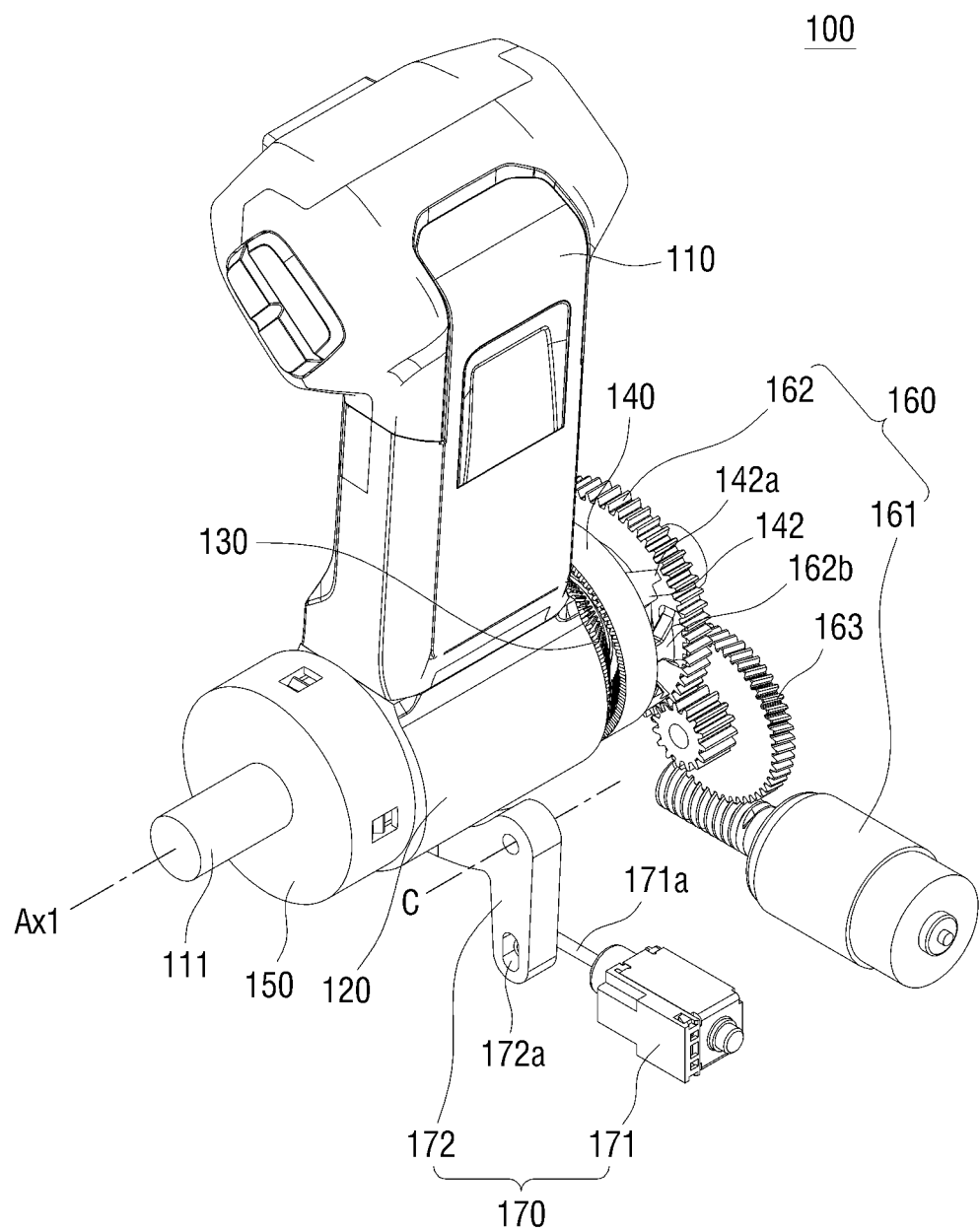
Figure 3:
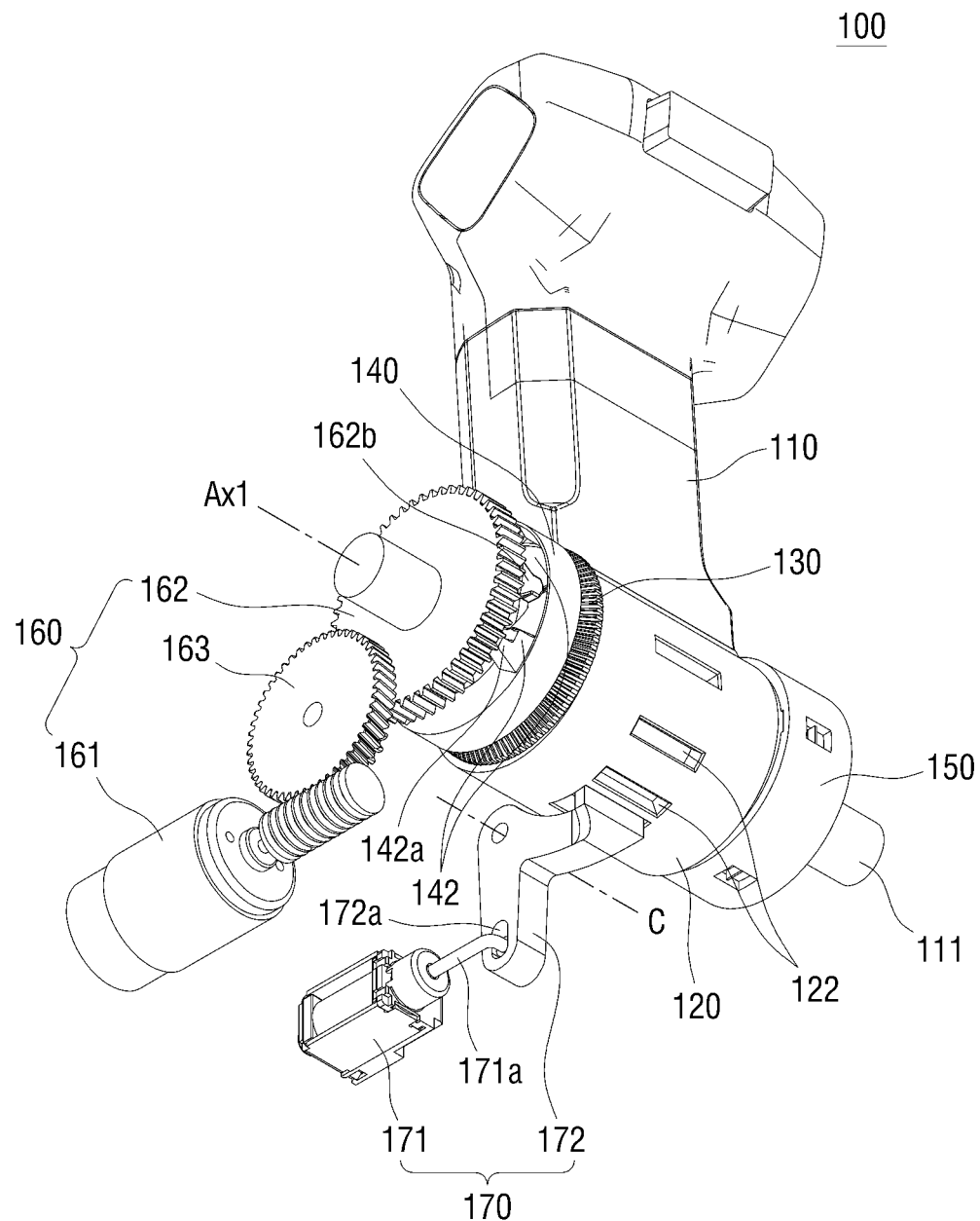
Figure 4:
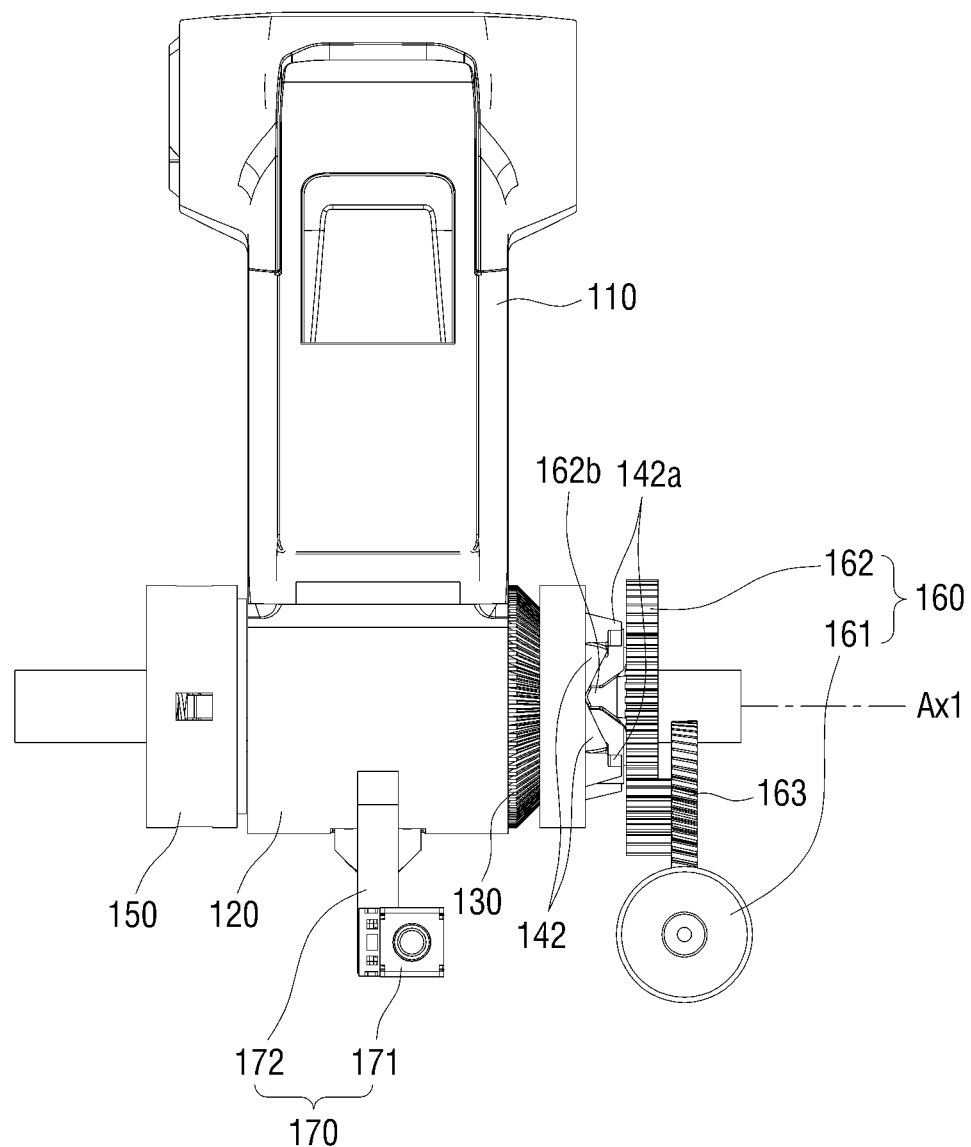
FIG. 4 is a front view of the automotive transmission according to an exemplary embodiment of the present disclosure.
Figure 5:
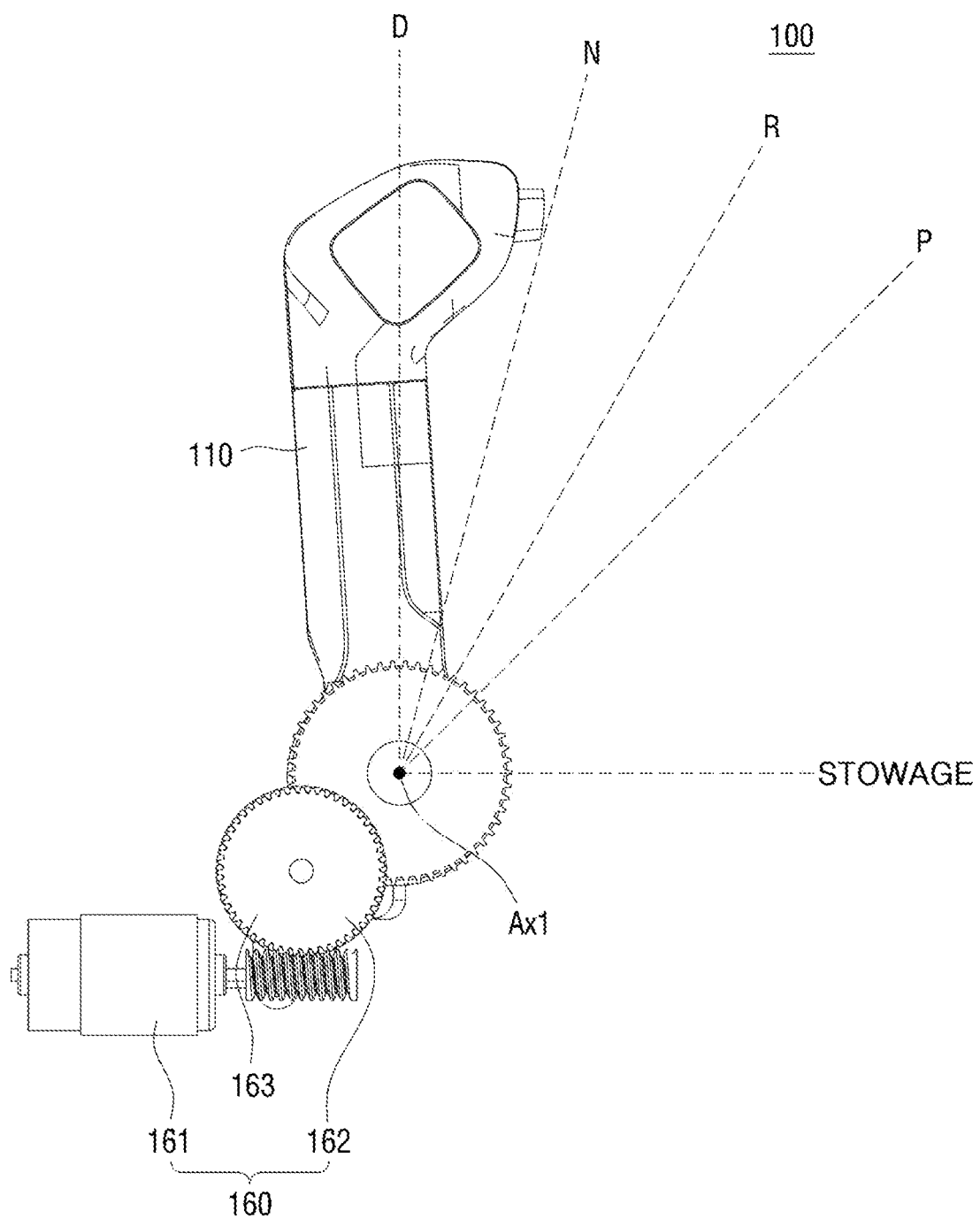
FIG. 5 is a side view of the automotive transmission according to an exemplary embodiment of the present disclosure.
Figure 6:
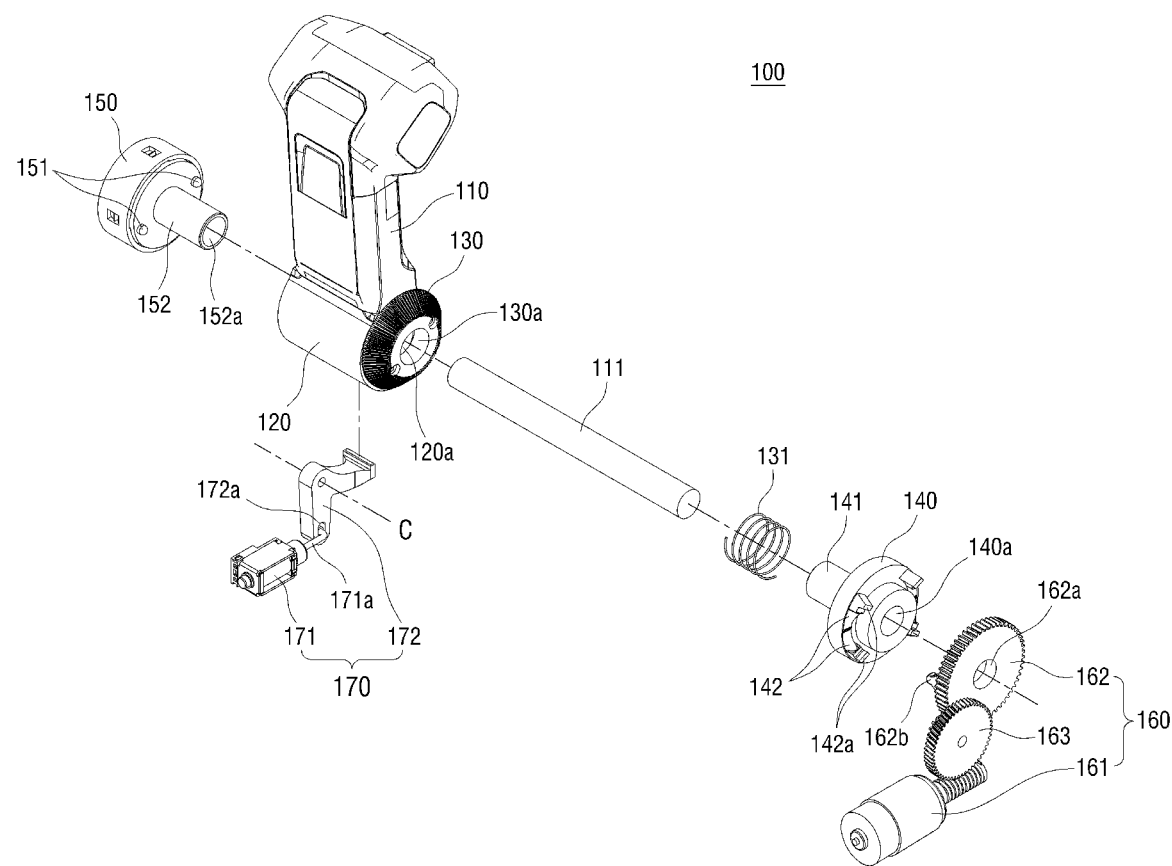
FIGS. 6 through 8 are exploded perspective views for illustrating an automotive transmission according to an exemplary embodiment of the present disclosure.
Figure 7:
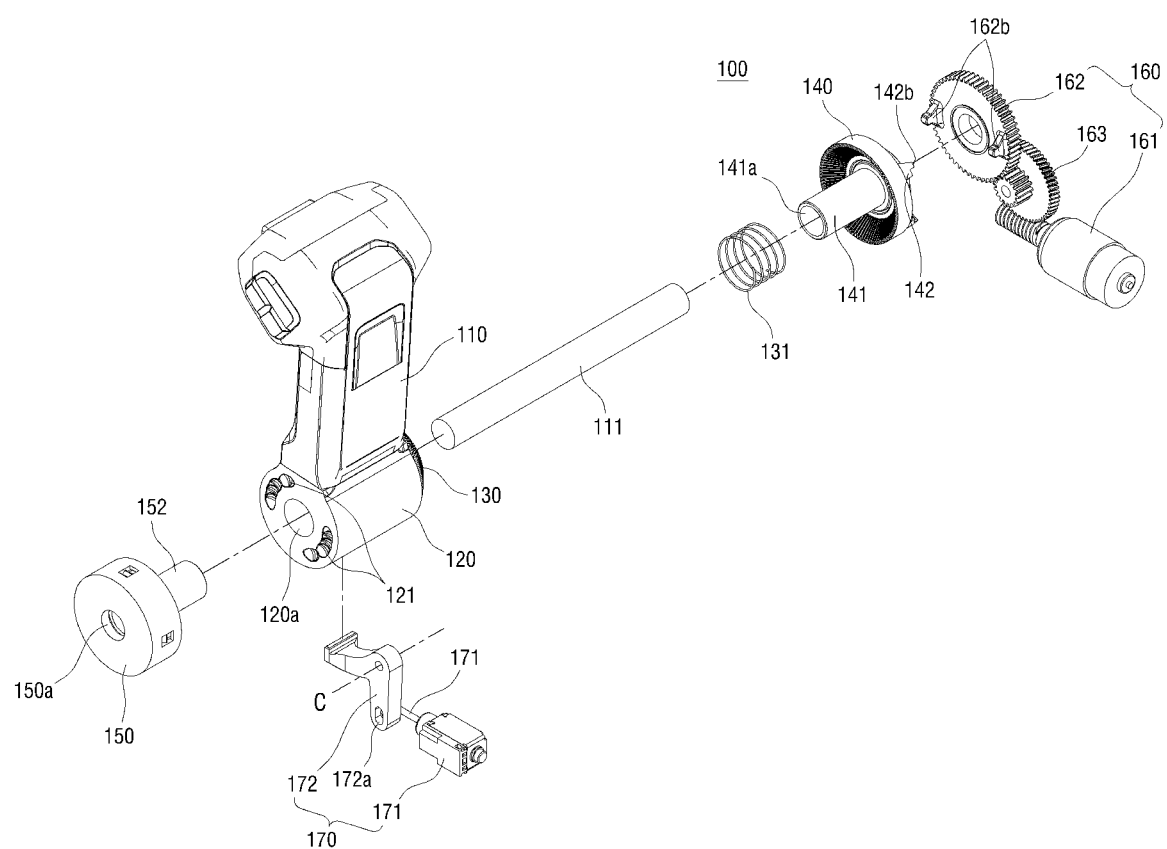
Figure 8:
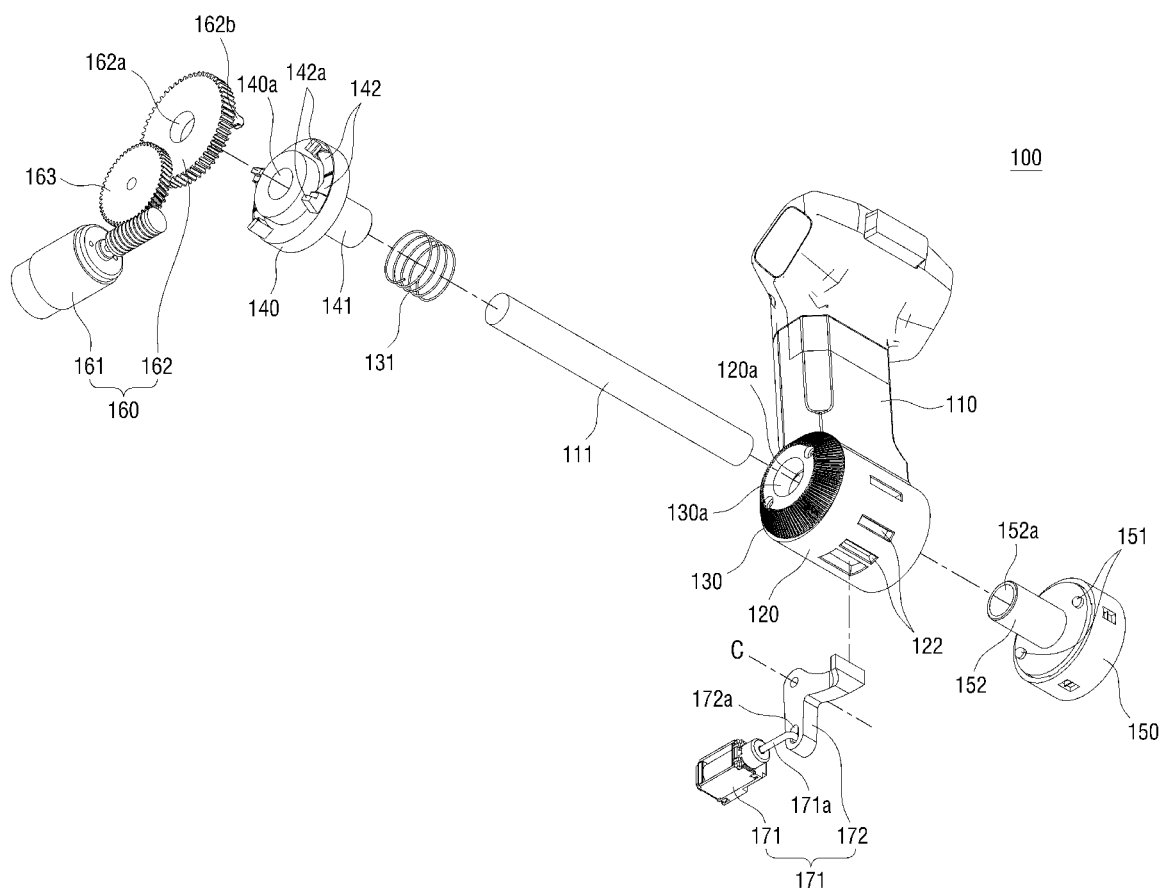

FIGS. 1 through 3 are perspective views for illustrating an automotive transmission according to an exemplary embodiment of the present disclosure, FIG. 4 is a front view of the automotive transmission according to an exemplary embodiment of the present disclosure, FIG. 5 is a side view of the automotive transmission according to an exemplary embodiment of the present disclosure, and FIGS. 6 through 8 are exploded perspective views for illustrating an automotive transmission according to an exemplary embodiment of the present disclosure.

Referring to FIGS. 1 through 8, an automotive transmission 100 according to some exemplary embodiments of the present disclosure may include a gear shift lever 110, a rotation unit 120, a first gear unit 130, a second gear unit 140, a detent unit 150, a driving unit 160, and a locking unit 170. In the exemplary embodiments of the present disclosure, the automotive transmission 100 may be installed between a center fascia and a console box of a vehicle to allow a driver to be able to adjust a gear shift stage while driving the vehicle. However, the present disclosure is not limited thereto, and the automotive transmission 100 according to the exemplary embodiments of the present disclosure may be installed in various positions with high accessibility to the driver.

The gear shift lever 110 may be rotated around a rotation axis Ax1 to adjust the gear shift stage when an external force is applied to the gear shift lever 110. In the exemplary embodiments of the present disclosure, the gear shift lever 110 may be a joystick type.

However, the present disclosure is not limited thereto, and the gear shift lever 110 may be a dial type or a combined type of the joystick type and the dial type. In the exemplary embodiments of the present disclosure, gear shift stages that may be selected by rotation of the gear shift lever 110 include parking P, reverse R, neutral N, and driving D stages. Positions of the gear shift lever 110 include a P-stage position, an R-stage position, an N-stage position, a D-stage position, and a stowage position in which the gear shift lever 110 is stowed in a predetermined stowage space.

The stowage position may be a position at which adjusting the gear shift stage is not substantially performed, and the gear shift lever 110 is stowed in the predetermined stowage space not to be exposed to the inside of the vehicle. The stowage position may be understood as a position in which the gear shift lever 110 is stowed in the predetermined stowage space when adjustment of the gear shift stage using the gear shift lever 110 is unnecessary, like when ignition of the vehicle is off, to improve the space utilization of the inside of the vehicle. In the exemplary embodiments of the present disclosure, the gear shift stage in the stowage position may be maintained in a P-stage. When ignition of the vehicle is turned on with the gear shift lever 110 stowed in the stowage position, the gear shift lever 110 may be moved to the P-stage position to allow the gear shift lever 110 to be operable.

The rotation unit 120 may be rotated together with the gear shift lever 110. In the exemplary embodiments of the present disclosure, the rotation unit 120 may be coupled to one end of the gear shift lever 110 and thus may be rotated around the same rotation axis as the rotation axis Ax1 of the gear shift lever 110. The rotation unit 120 may include a hollow 120a, through which a shaft 111 passes, and may be rotated around the shaft 111. In this case, the rotation axis Ax1 of the gear shift lever 110 and the rotation unit 120 may be understood as a rotation axis of the shaft 111.

In the exemplary embodiments of the present disclosure, the rotation unit 120 may be coupled to one end of the gear shift lever 110 to allow the gear shift lever 110 and the rotation unit 120 to be rotated around the same rotation axis Ax1. However, this is merely an example for aiding in understanding of the present disclosure. When a structure for transmitting a rotational force is placed between the gear shift lever 110 and the rotation unit 120, the gear shift lever 110 and the rotation unit 120 may also be rotated around different rotation axes, and a detailed description thereof will be given below.

The first gear unit 130 may be rotated around the same rotation axis Ax1 as the rotation unit 120, and a hollow 130*a*, through which the shaft 111 passes, may be formed in the first gear unit 130, as in the rotation unit 120. The first gear unit 130 may be fixedly installed at a first side of the rotation unit 120 and may be rotated together with the rotation unit 120. Thus, when the gear shift lever 110 is rotated by the external force, the first gear unit 130 may be rotated, and conversely, when the first gear unit 130 is rotated by the external force, the gear shift lever 110 may be rotated.

The second gear unit 140 may be rotated around the same rotation axis Ax1 as the first gear unit 130, and a hollow 140*a*, through which the shaft 111 passes, may be formed in the second gear unit 140, as in the rotation unit 120 and the first gear unit 130. The position of the second gear unit 140 may be varied to be one among a coupled position where the second gear unit 140 is coupled to the first gear unit 130 and a separated position where the second gear unit 140 is separated from the first gear unit 130. When the second gear unit 140 is coupled to the first gear unit 130, the rotational force may be transferred between the first gear unit 130 and the second gear unit 140, and when the second gear unit 140 is separated from the first gear unit 130, rotational force may be unable to be transferred between the first gear unit 130 and the second gear unit 140.

In this case, an elastic member 131 having both ends for elastically supporting the first gear unit 130 and the second gear unit 140 may be disposed between the first gear unit 130 and the second gear unit 140. When the second gear unit 140 is coupled to the first gear unit 130, the elastic member 131 may be compressed, and when the second gear unit 140 is separated from the first gear unit 130 due to a restoring force of the elastic member 131, the second gear unit 140 may be moved to an original position thereof, i.e., a position before the second gear unit 140 is coupled to the first gear unit 130.

Further, the first gear unit 130 may be an external gear having an outer diameter which decreases gradually from a first side proximate to the rotation unit 120 to a second side proximate to the second gear unit 140. The second gear unit 140 may be an internal gear having an inner diameter, which decreases gradually from a first side proximate to the first gear unit 130 to a second side distant from the first gear unit 130. Thus, when the second gear unit 140 that rotates around the same rotation axis Ax1 as the first gear unit 130 is moved along the rotation axis Ax1, the second gear unit 140 may be coupled to or separated from the first gear unit 130 based on a movement direction of the second gear unit 140.

In the exemplary embodiments of the present disclosure, the first gear unit 130 may be an external gear, and the second gear unit 130 may be an internal gear. However, the present disclosure is not limited thereto, and the first gear unit 130 may also be an internal gear having an inner diameter which increases gradually from a first side proximate to the rotation unit 120 to a second side proximate to the second gear unit 140, and the second gear unit 140 may also be an external gear having an outer diameter which decreases gradually from a first side proximate to the first gear unit 130 to a second side distant from the first gear unit 130. Also, in the exemplary embodiments of the present disclosure, the first gear unit 130 may be an external gear, and the second gear unit 140 may be an internal gear, but a reverse case may also be possible.

The detent unit 150 may be disposed at a second side of the rotation unit 120, and a hollow 150*a* through which the shaft 111 passes may be formed in the detent unit 150, as in the rotation unit 120, the first gear unit 130, and the second gear unit 140. The position of the detent unit 150 may be varied based on the position of the second gear unit 140 so that, when the gear shift lever 110 is rotated, handling feedback may be provided selectively. In other words, at least one detent groove 121 may be formed in the second side of the rotation unit 120 and may have a predetermined radius around the rotation axis Ax1 of the rotation unit 120 at a surface that faces the detent unit 150. At least one detent groove 121 may include a plurality of detent grooves into which the detent unit 150 is inserted when the gear shift lever 110 is placed in each gear shift stage.

The detent unit 150 may include at least one bullet 151 disposed to allow the detent unit 150 to be inserted into at least one of the plurality of detent grooves. When at least one bullet 151 is elastically supported by a spring or the like and the gear shift lever 110 is rotated around the rotation axis Ax1, the detent unit 150 may cause a handling feedback while the detent unit 150 is maintained in contact with the detent groove 121 and is moved from one of the plurality of detent grooves to another.

The detent unit 150 may cause the handling feedback selectively based on the position of the second gear unit 140, which may be understood as that the detent unit 150 may cause a handling feedback when the second gear unit 140 is separated from the first gear unit 130, and thereby at least one bullet 151 is disposed in contact with at least one groove 121.

The second gear unit 140 and the detent unit 150 may include a first extension part 141 and a second extension part 152 which extend toward each other. The first extension part 141 may have a hollow 141*a* through which the shaft 111 passes, extend toward the detent unit 150, and extend to the hollow 120*a* of the rotation unit 120 through the hollow 130*a* of the first gear unit 130. In addition, the second extension part 152 may have a hollow 152*a* through which the shaft 111 passes, extend toward the second gear unit 140, and extend to the hollow 120*a* of the rotation unit 120.

Figure 9:
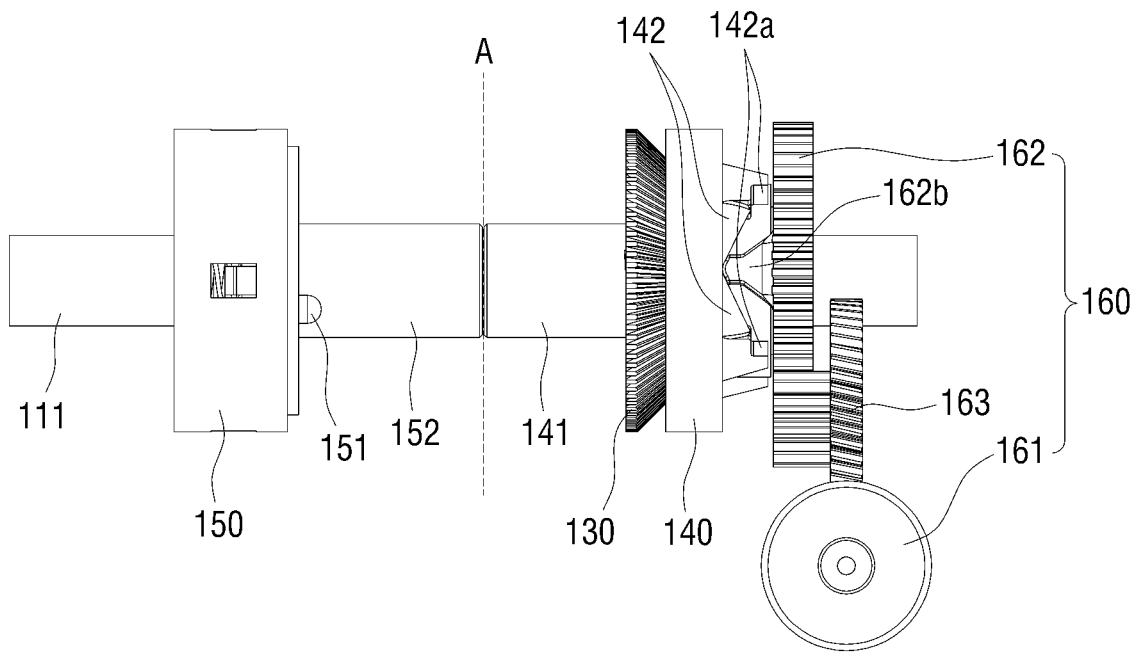
FIGS. 9 and 10 are front views of a second gear unit and a detent unit according to an exemplary embodiment of the present disclosure.

In particular, adjacent ends of the first extension part 141 and the second extension part 152 may abut each other at a predetermined point A between the second gear unit 140 and the detent unit 150, as shown in FIG. 9. Thus, when the second gear unit 140 is displaced in a direction in which the second gear unit 140 is coupled to the first gear unit 130, the detent unit 150 may be displaced in a direction in which the detent unit 150 is spaced apart from the second side of the rotation unit 120 due to the first extension part 141, and the bullet 151 of the detent unit 150 may be spaced apart from the detent groove 121. Accordingly, even when the gear shift lever 110 is rotated, a handling feedback may be prevented from occurring.

In addition, when the second gear unit 140 coupled to the first gear unit 130 is displaced in a direction in which the second gear unit 140 is separated from the first gear unit 130, the detent unit 150 may be displaced in a direction in which at least one bullet 151 may be in contact with the detent groove 121 and may cause the handling feedback when the gear shift lever 110 is rotated. In particular, since the detent unit 150 is elastically supported by an elastic body (not shown), such as a spring, when the second gear unit 140 is coupled to the first gear unit 130, the elastic body may be compressed, and when the second gear unit 140 is separated from the first gear unit 130, the detent unit 150 may return to the previous position, i.e., a position at which at least one bullet 151 is in contact with (e.g., abuts) the detent groove 121, due to the restoring force of the elastic body. Thus, when the occurrence of the handling feedback is not required even when the gear shift lever 110 is rotated, the handling feedback may be prevented from occurring by changing the position of the detent unit 150 as described above. Thus, noise or abrasion may be prevented from occurring due to the occurrence of unnecessary handling feedback.

The driving unit 160 may change the position of the second gear unit 140 and provide a driving force to cause the second gear unit 140 to be rotated. The driving unit 160 may include an actuator 161 and a driving gear 162. A driving force for rotating the driving gear 162 may be generated by the actuator 161. In the exemplary embodiments of the present disclosure, the driving force of the actuator 161 may be transferred to the driving gear 162 via at least one gear 163. However, a gear ratio or the like, the size or number of gears 163 may be varied, or gears 163 may be omitted.

The driving gear 162 may have a hollow 162a through which the shaft 111 passes, and a protrusion 162b may be formed on a surface that faces the second gear unit 140 and is rotated with a predetermined radius when the driving gear 162 is rotated. The protrusion 162b may be formed to have a protrusion height that corresponds substantially to a separation distance between the driving gear 162 and the second gear unit 140 when the driving gear 162 and the second gear unit 140 are separated from each other.

The second gear unit 140 may have guide parts 142 on a surface that faces the driving gear 162. The guide parts 142 may be formed so that, when the driving gear 162 is rotated, the protrusion height of the guide parts 142 that face the driving gear 162 increases from a first side, at which the protrusion 162b enters, to a second side in a rotation direction of the driving gear 162, and thus, the guide parts 142 may guide movement of the second gear unit 140. In addition, the guide parts 142 may be formed in different (e.g., both) directions so that, when the driving gear 162 is rotated in a different direction, the protrusion height also increases to the second side from the first side at which the protrusion 162b enters. The guide parts 142 may be formed in both directions to allow the gear shift lever 110 to be rotated in different directions.

A blocking part 142a that blocks movement of the protrusion 162b may be formed at the second side of the guide part 142, and when the driving gear 162 is rotated after the protrusion 162b enters from the first side of the guide part 142 and is disposed to abut the blocking part 142a formed at the second side of the guide part 142, the second gear unit 140 may be rotated together with the driving gear 162.

Figure 10:
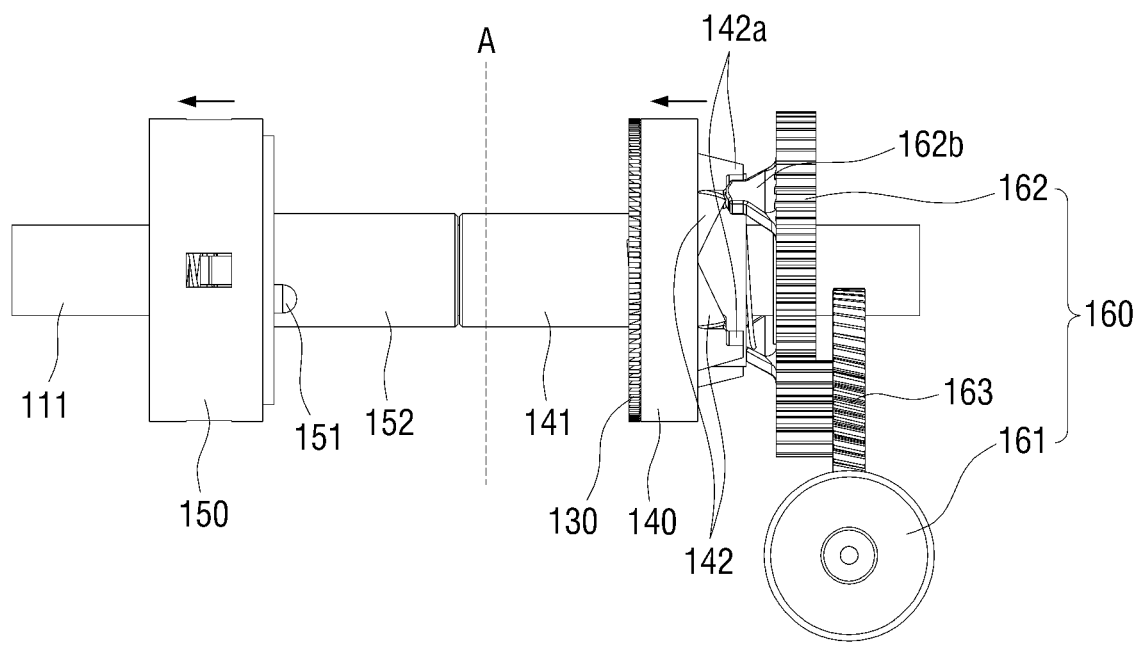

Furthermore, since the protrusion 162b is formed to have the protrusion height that corresponds to the separation distance between the driving gear 162 and the second gear unit 140 when the driving gear 162 and the second gear unit 140 are separated from each other, when the protrusion 162b enters from the first side of the guide part 142 and is disposed at the second side of the guide part 142 by the rotation of the driving gear 162, as shown in FIG. 10, a force may be applied to the second gear unit 140 in a direction toward the detent unit 150 due to the protrusion height of the guide part 142, and the second gear unit 140 may be displaced in a direction in which the second gear unit 140 is coupled to the first gear unit 130. In this case, a point where adjacent ends of the first extension part 141 and the second extension part 152 are in contact with each other, may be displaced to the detent unit 150 as compared to FIG. 9 described above to cause the detent unit 150 to be displaced in a direction in which the detent unit 150 is spaced apart from the second side of the rotation unit 120, and the bullet 151 may be spaced apart from the detent groove 121, as shown in FIG. 11.

Figure 11:
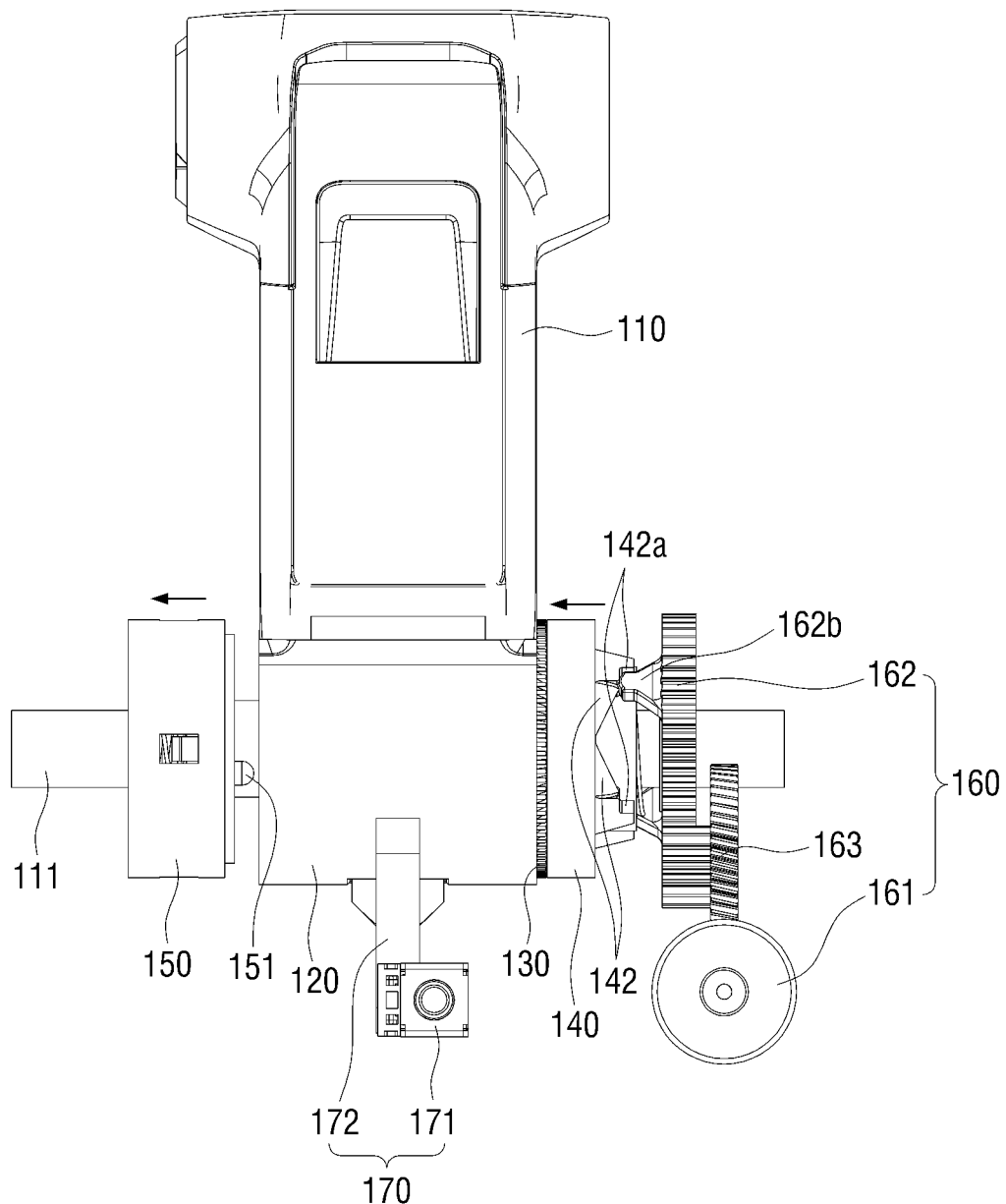
FIG. 11 is a schematic view of operations of the second gear unit and the detent unit for a gear shift lever returning to a non-driving stage according to an exemplary embodiment of the present disclosure.
Figure 12:
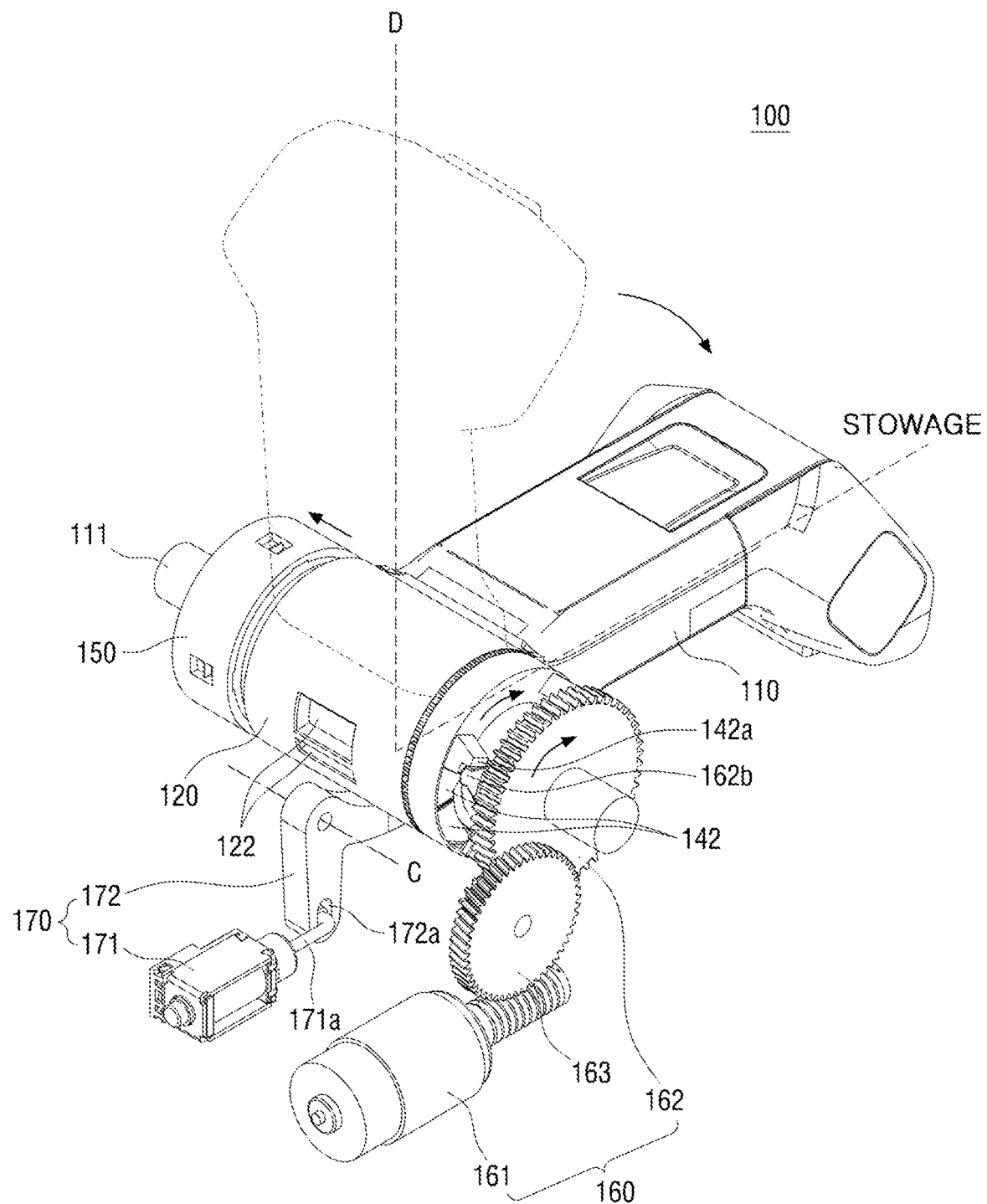
FIG. 12 is a schematic view of a gear shift lever returning to the non-driving stage according to an exemplary embodiment of the present disclosure.

When the driving gear 162 is rotated while the protrusion 162b is in contact with the blocking part 142a, as illustrated in FIG. 11 described above, the rotational force of the driving gear 162 may be transferred to the rotation unit 120 via the second gear unit 140 and the first gear unit 130 to cause the gear shift lever 110 to be rotated as illustrated in FIG. 12. FIG. 12 is an example where the gear shift lever 110 is rotated from a D-stage position to a stowage position. The gear shift lever 110 may return to a non-driving stage position when return conditions are satisfied in a driving stage position, and a detailed description thereof will be provided below.

When the second gear unit 140 is coupled to the first gear unit 130, the detent unit 150 may be spaced apart from the rotation unit 120, and the driving force transferred to the driving gear 162 may be transferred to the second gear unit 140 and the first gear unit 130 so that, when the gear shift lever 110 is rotated, unnecessary handling feedback may be prevented from occurring and thus noise or abrasion may be reduced.

Figure 13:
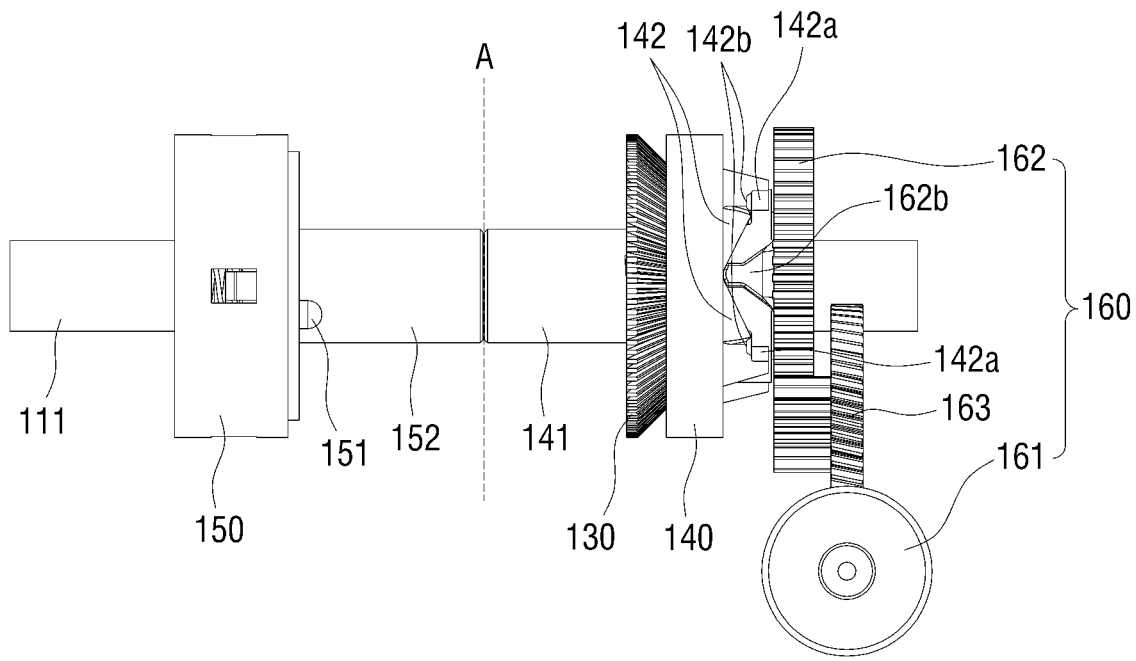
FIGS. 13 and 14 are front views of a guide portion of the second gear unit according to an exemplary embodiment of the present disclosure.
Figure 14:
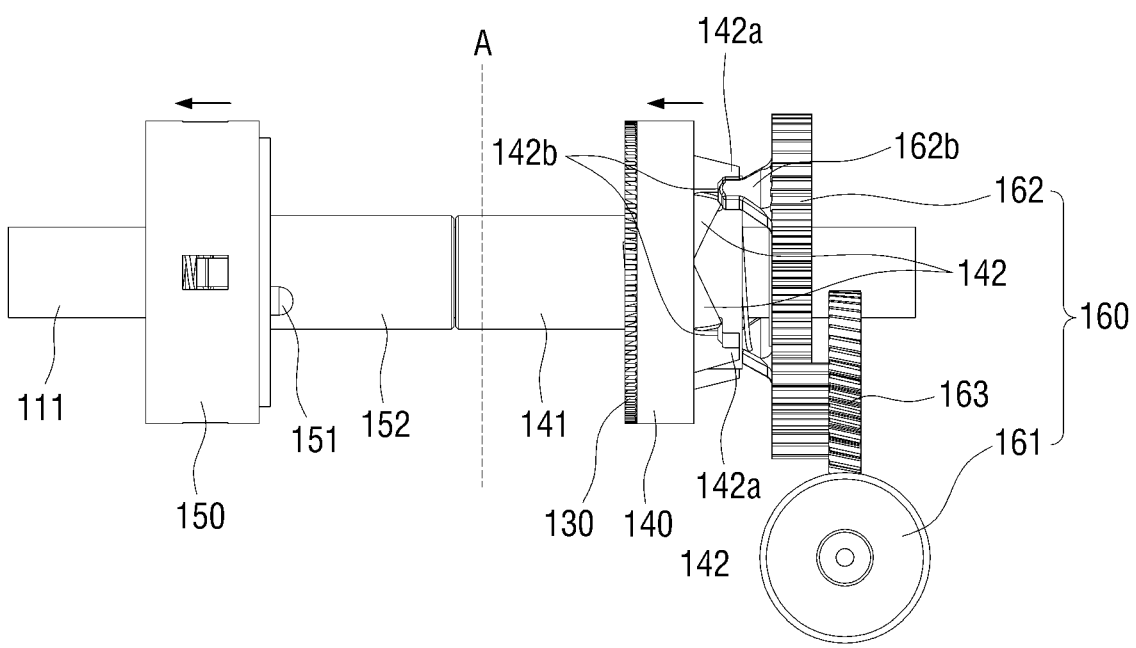

In addition, the guide part 142 may include an insertion groove 142b into which a part of the protrusion 162b may be inserted, as illustrated in FIG. 13. When the protrusion 162b is disposed at the second side of the protruding guide part 142, as shown in FIG. 14, a part of the protrusion 162b may be inserted into the insertion groove 142b so that, when the gear shift lever 110 is rotated by the driving force transferred from the driving gear 162, the gear shift lever 110 may be prevented from rotating at a higher speed than a rotation speed of the driving gear 162 due to a weight of the gear shift lever 100, and the protrusion 162b may be prevented from being separated from the second side of the protruding guide part 142. Accordingly, a case where a driving force is not transferred may be prevented from occurring.

When the gear shift lever 110 returns to the non-driving stage from the driving stage, a driving force may be generated in the driving unit 160 as described above, and when return conditions of the gear shift lever 110 are satisfied, a driving force may be generated by the driving unit 160.

In the exemplary embodiments of the present disclosure, the return conditions of the gear shift lever 110 may be satisfied when ignition of the vehicle is turned off in the driving stage. In this case, the driving force may be generated from the driving unit 160 to rotate the driving gear 162 to allow the second gear unit 140 to be coupled to the first gear unit 130 and to return the gear shift lever 110 to the non-driving stage. For example, when ignition of the vehicle is turned off in the D-stage, the driving unit 160 may rotate the driving gear 162 to cause the second gear unit 140 to be coupled to the first gear unit 130 and simultaneously, the detent unit 150 to be spaced apart from the second side of the rotation unit 120, and the gear shift lever 110 may return to the non-driving stage, as illustrated in FIG. 12 described above.

Figure 15:
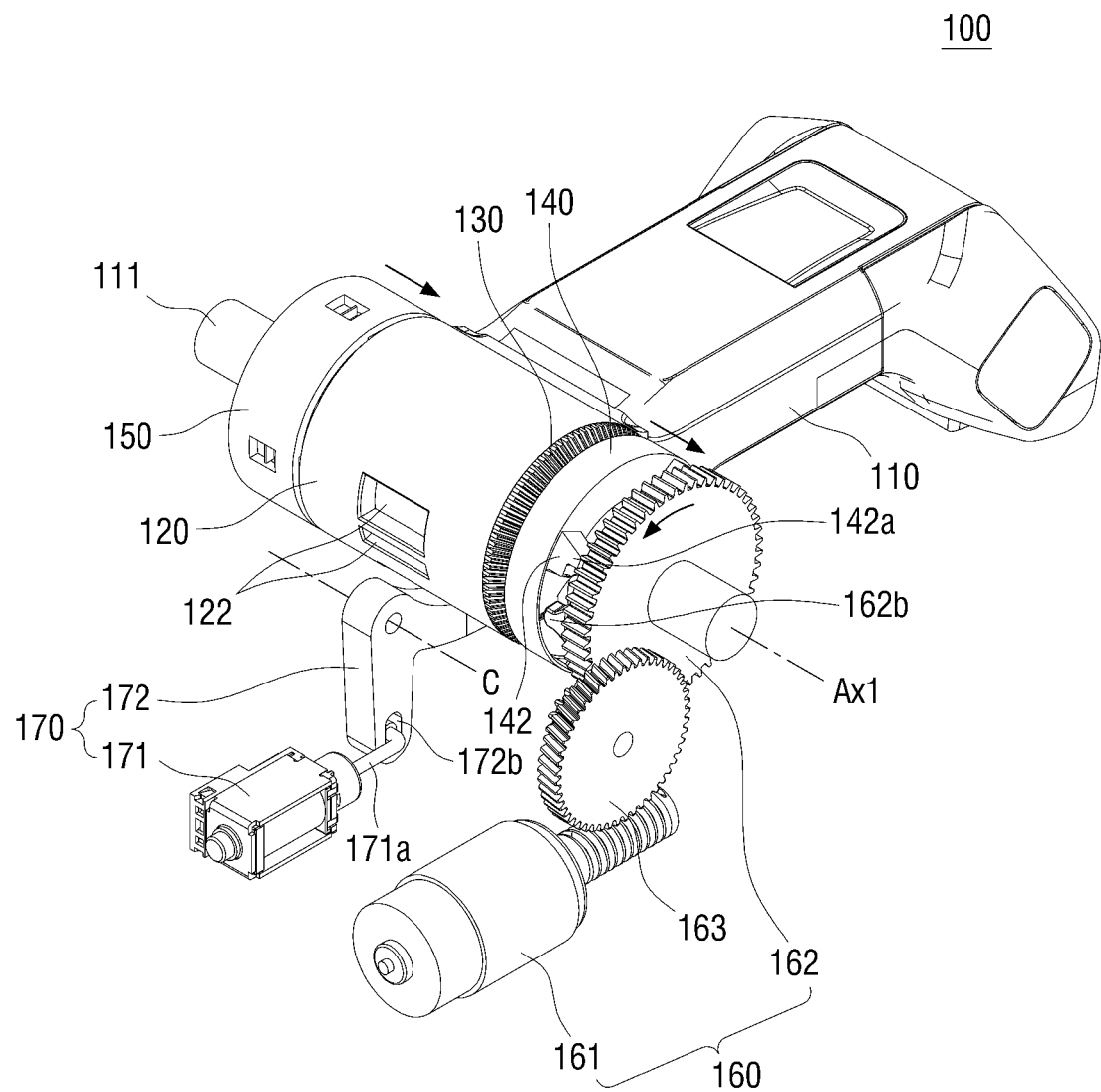
FIGS. 15 and 16 are schematic views of an initialization operation after the gear shift lever according to an exemplary embodiment of the present disclosure returns to the non-driving stage.
Figure 16:
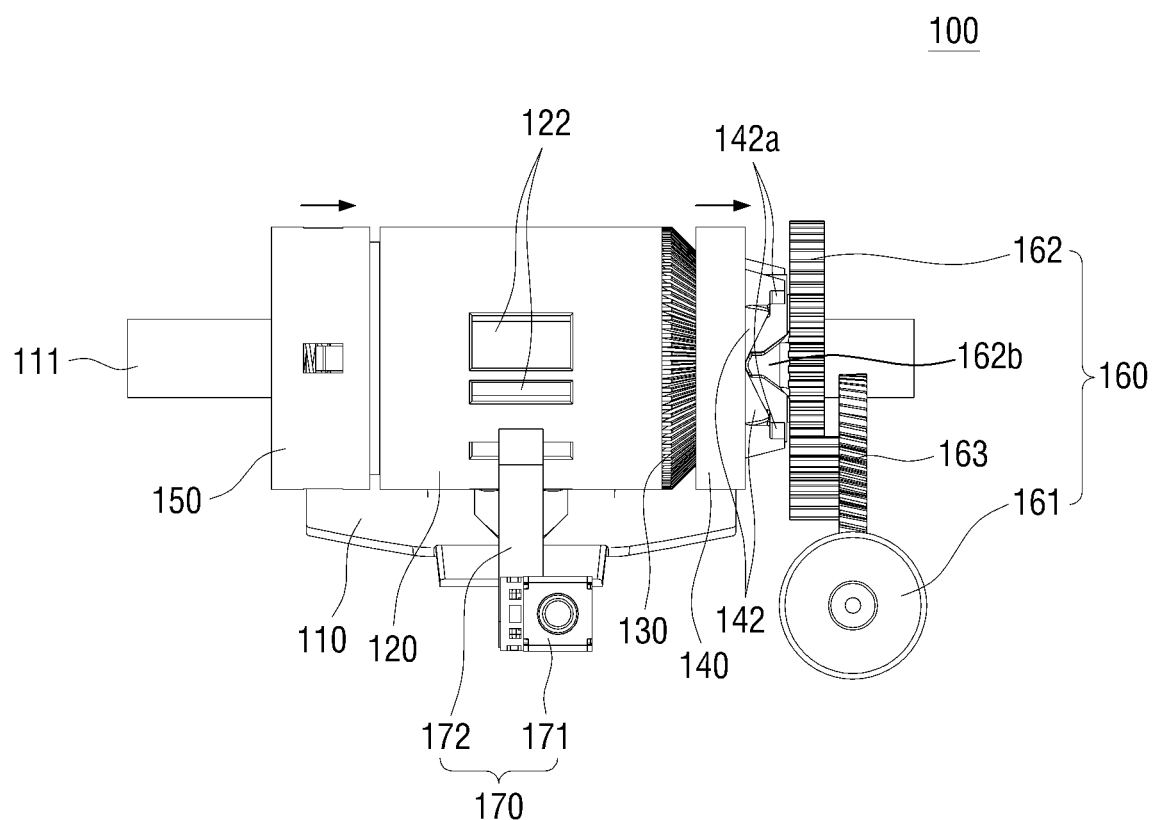

The non-driving stage may include a P-stage position and a stowage position. In the exemplary embodiments of the present disclosure, when the ignition of the vehicle is turned off in the driving stage, the driving unit 160 may return the gear shift lever 110 to the stowage position, and when the vehicle is operated later, the gear shift lever 110 may be moved from the stowage position to the P-stage position. However, the present disclosure is not limited thereto, and when the ignition of the vehicle is turned off, the gear shift lever 110 may return to the P-stage position. In this case, a procedure in which the gear shift lever 110 is moved from the stowage position to the P-stage position may be omitted. The driving unit 160 may return the protrusion 162b to an initial position, i.e., a position before the protrusion 162b enters the first side of the guide part 142, as illustrated in FIGS. 15 and 16, after the gear shift lever 110 returns to the non-driving stage.

Figure 17:
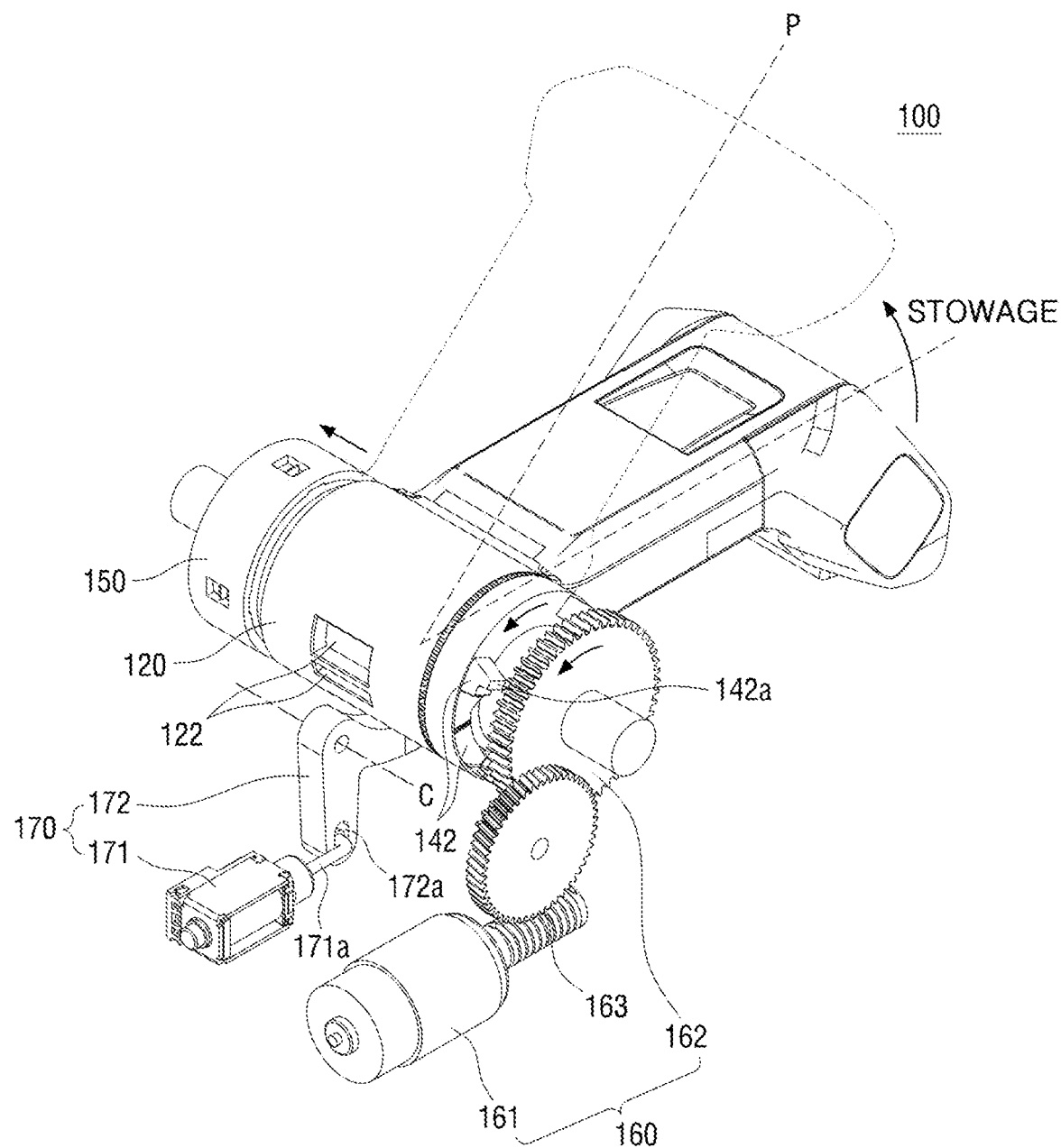
FIGS. 17 and 18 are schematic views of operations of the second gear unit and the detent unit to move the gear shift lever according to an exemplary embodiment of the present disclosure to a position of a P-stage from a stowage position.
Figure 18:
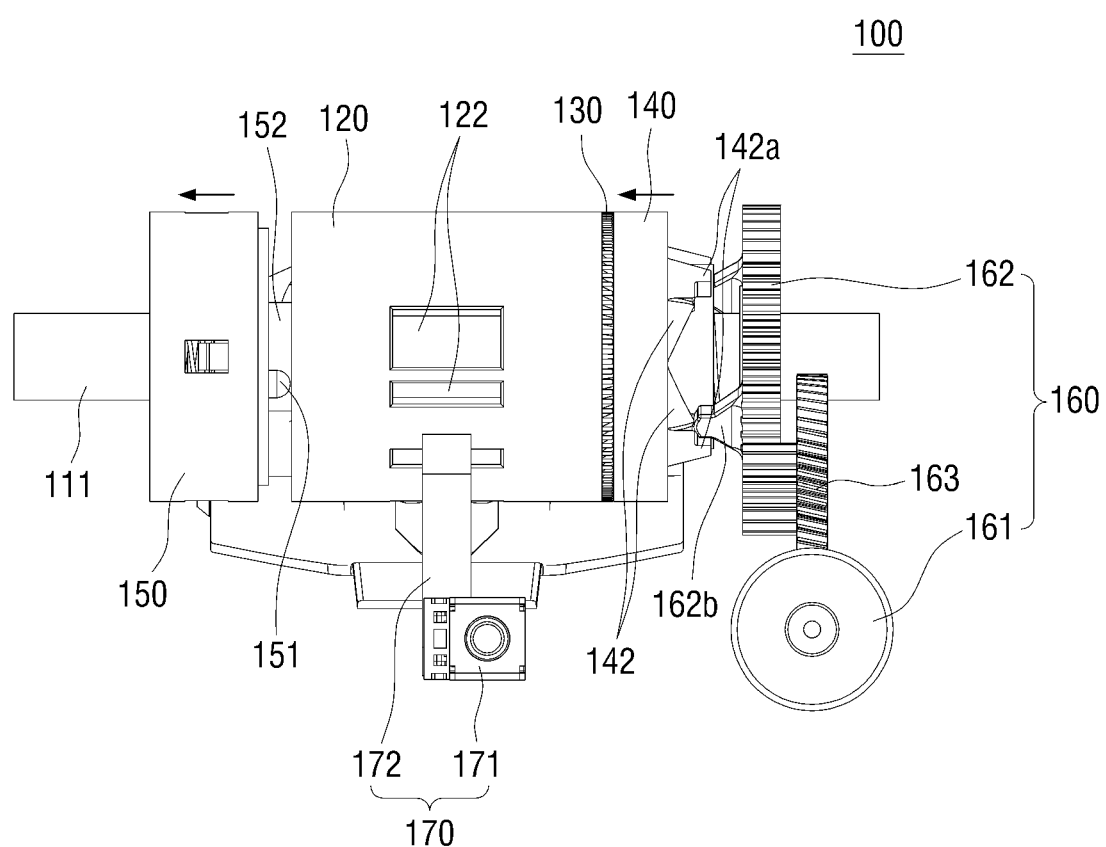
Figure 19:
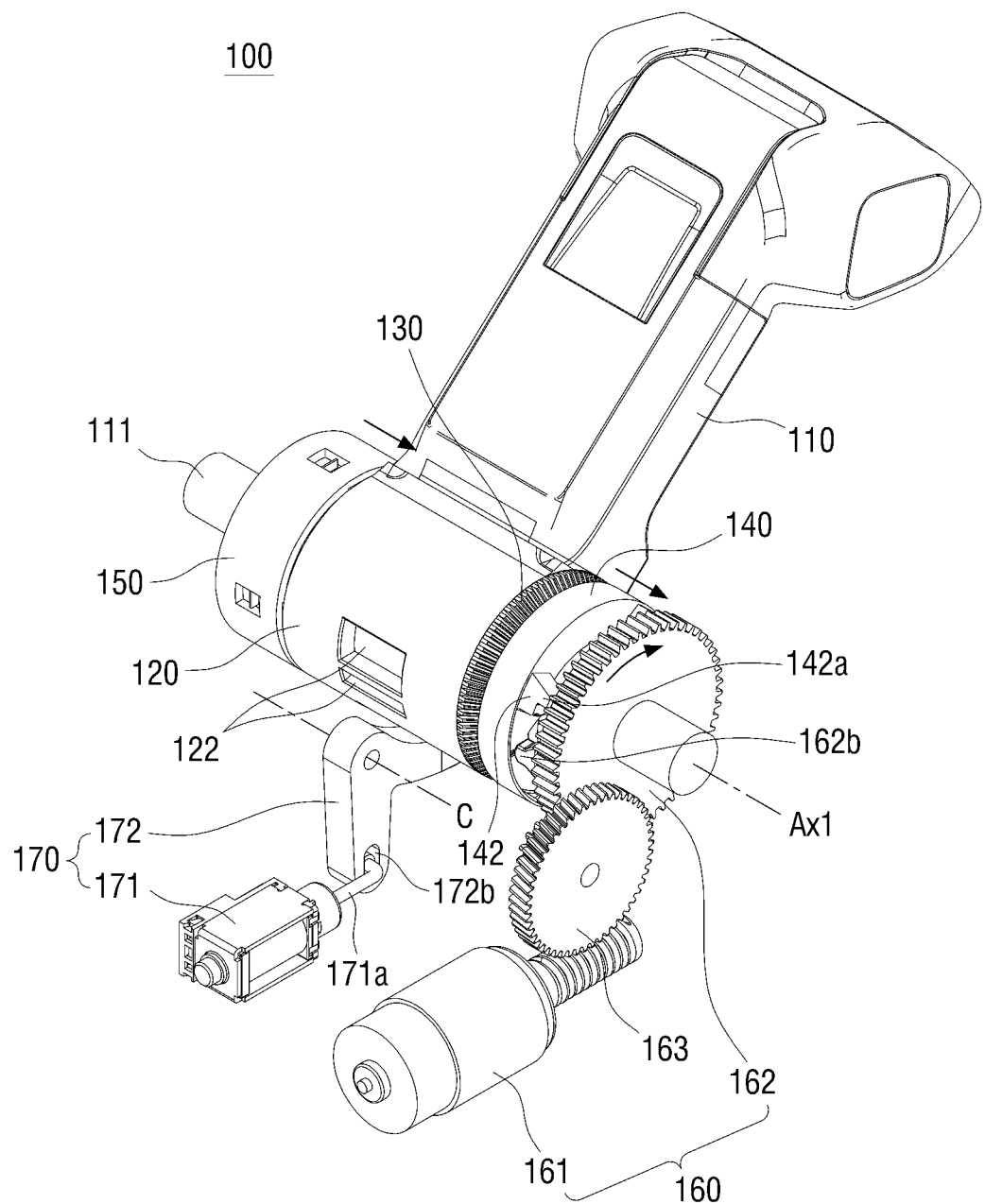
FIGS. 19 and 20 are schematic views of the initialization operation after the gear shift lever according to an exemplary embodiment of the present disclosure is moved to the position of the P-stage from the stowage position.
Figure 20:
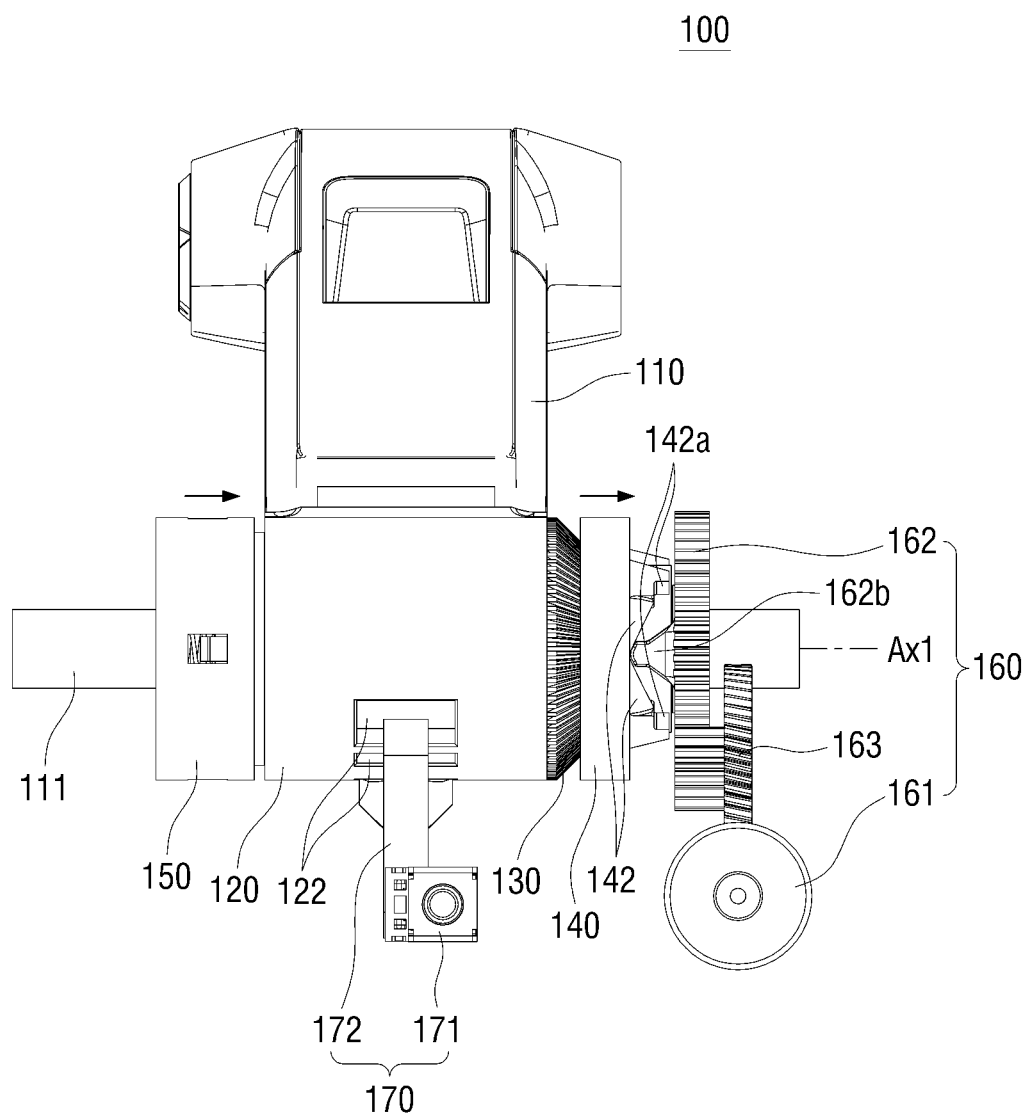

Furthermore, when the ignition of the vehicle is turned on, the driving unit 160 may rotate the driving gear 162 in an opposite direction to a direction in which the gear shift lever 110 returns to the non-driving stage to dispose the protrusion 162b at the second side of the guide part 142, as shown in FIGS. 17 and 18, and the second gear unit 140 may be coupled to the first gear unit 130, and simultaneously, after the gear shift lever 110 is moved to the P-stage position while the detent unit 150 is spaced apart from the rotation unit 120, the protrusion 162b may return to the initial position, as shown in FIGS. 19 and 20, and at least one bullet 151 of the detent unit 150 may abut the detent groove 121 formed in the second side of the rotation unit 120 to allow the handling feedback to be generated when the gear shift lever 110 is operated by the driver.

In other words, in the automotive transmission 100 according to the present disclosure, when the gear shift stage is adjusted by the driver, the handling feedback may be generated, and when the gear shift lever 110 is rotated by the driving unit 160, the handling feedback may be prevented from occurring to avoid unnecessary noise or abrasion. In addition, in the automotive transmission 100 according to the present disclosure, both the occurrence of handling feedback of the gear shift lever 110 and rotation of the gear shift lever 110 may be implemented by changing the position of the second gear unit 140 to cause the second gear unit 140 to be coupled to or to be separated from the first gear unit 130. Thus, a configuration for generating the handling feedback of the gear shift lever 110 and a configuration for rotating the gear shift lever 110 may not require to be additionally provided, and therefore, the configuration of the automotive transmission 100 may be simplified.

The locking unit 170 may adjust from a gear shift stage to another gear shift stage when the gear shift lever 110 satisfies predetermined gear shift conditions. The locking unit 170 may include an actuator 171 and a locking rod 172, of which a position is adjusted by the actuator 171 to allow one end of the locking rod 172 to be inserted into or to be withdrawn from at least one fixing groove 122 formed along a circumference of the rotation unit 120, and therefore, the locking rod 172 may confine or release the rotation of the rotation unit 120.

In the exemplary embodiments of the present disclosure, the actuator 171 will be described as a solenoid including a moving rod 171a that moves linearly, and a first end of the moving rod 171a may be inserted into a connection groove 172a of the locking rod 172, and the locking rod 172 may be rotated around a rotation axis C based on a movement direction of the moving rod 171a to allow a first end of the locking rod 172 to be inserted into or released from at least one fixing groove 122. In the above-described exemplary embodiments, a rotation axis of the gear shift lever 110 and a rotation axis of the rotation unit 120 may coincide with each other. However, this is merely an example for aiding in understanding of the present disclosure, and the present disclosure is not limited thereto. The rotation axis of the gear shift lever 110 and the rotation axis of the rotation unit 120 may be different from each other.

Figure 21:
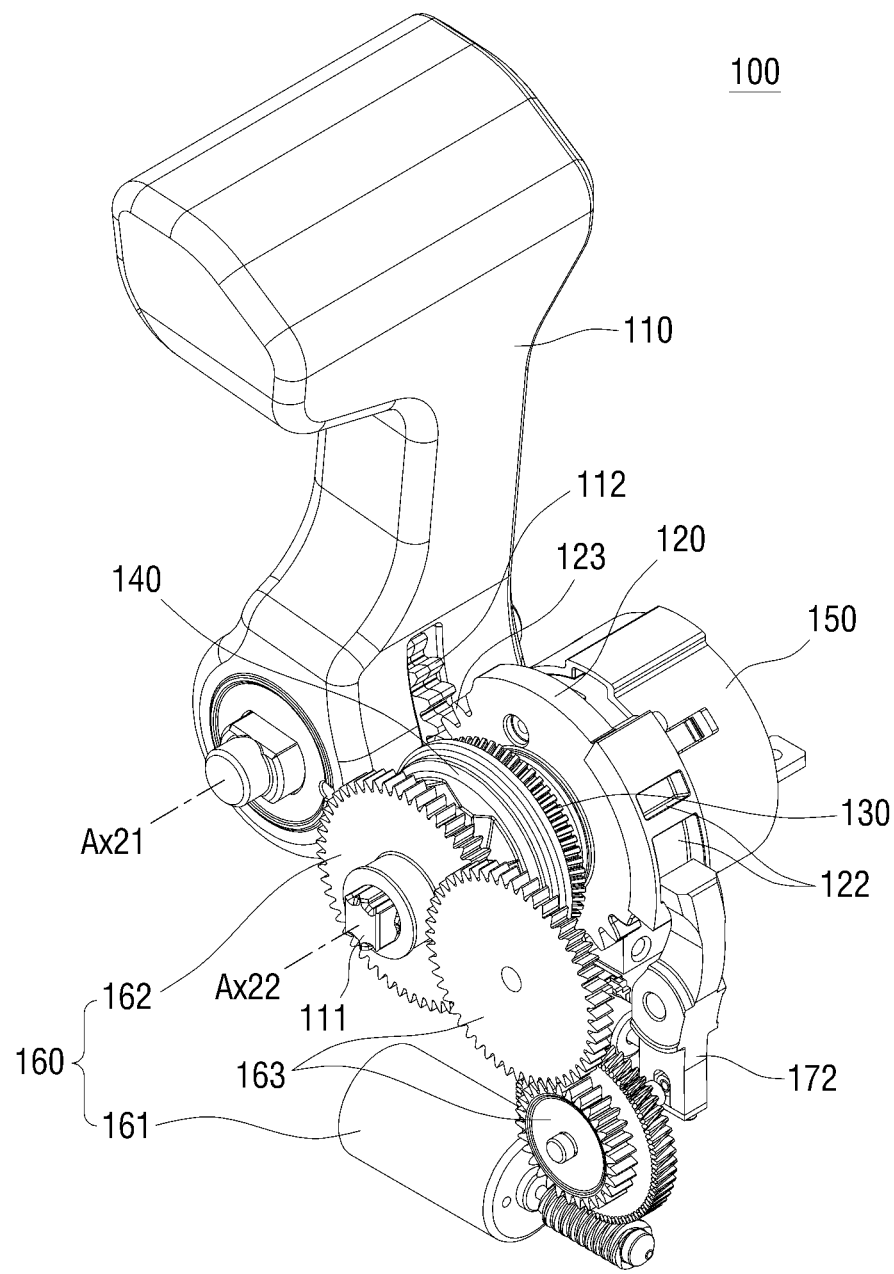
FIGS. 21 and 22 are perspective views of an automotive transmission according to an exemplary embodiment of the present disclosure.
Figure 22:
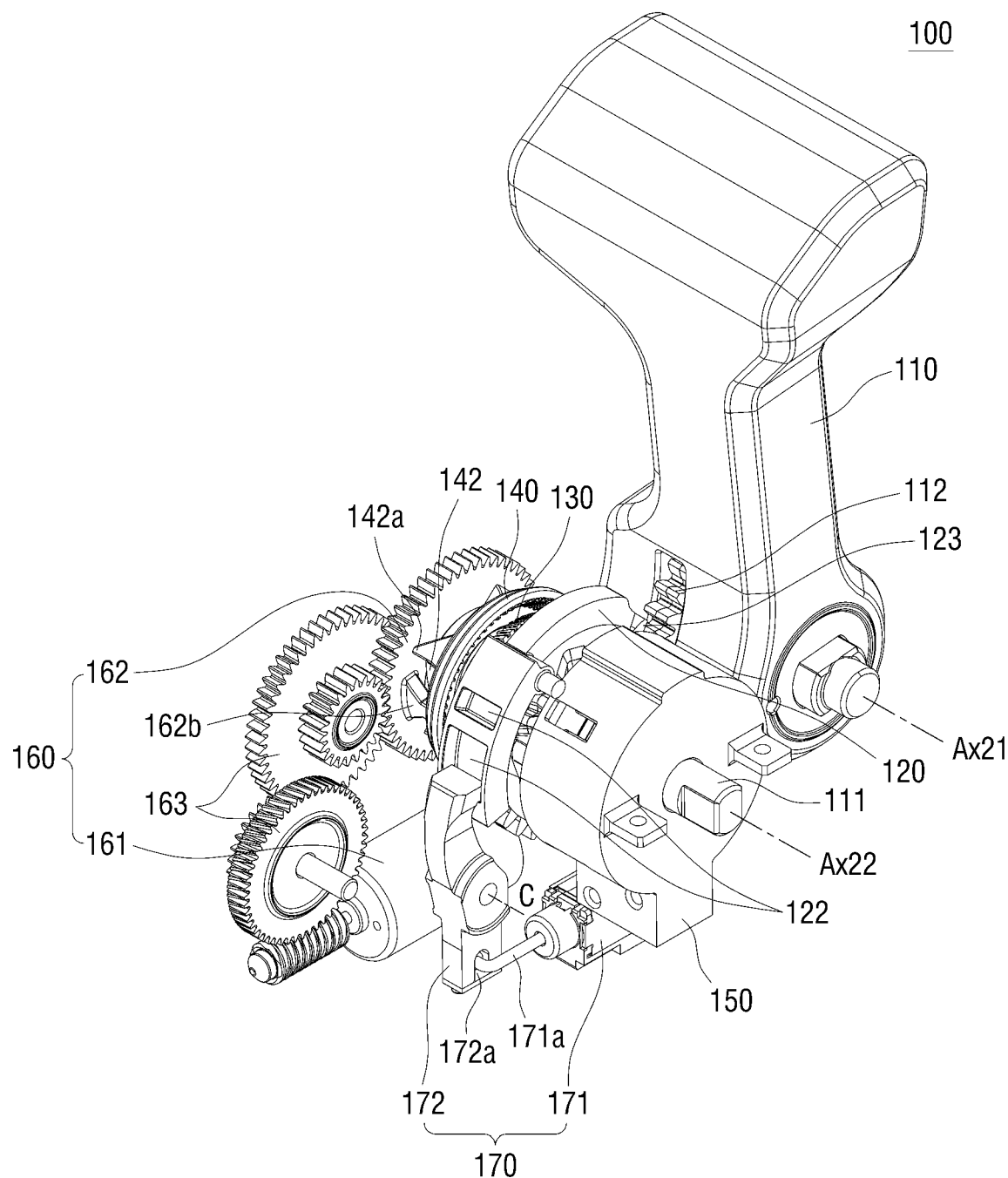
Figure 23:
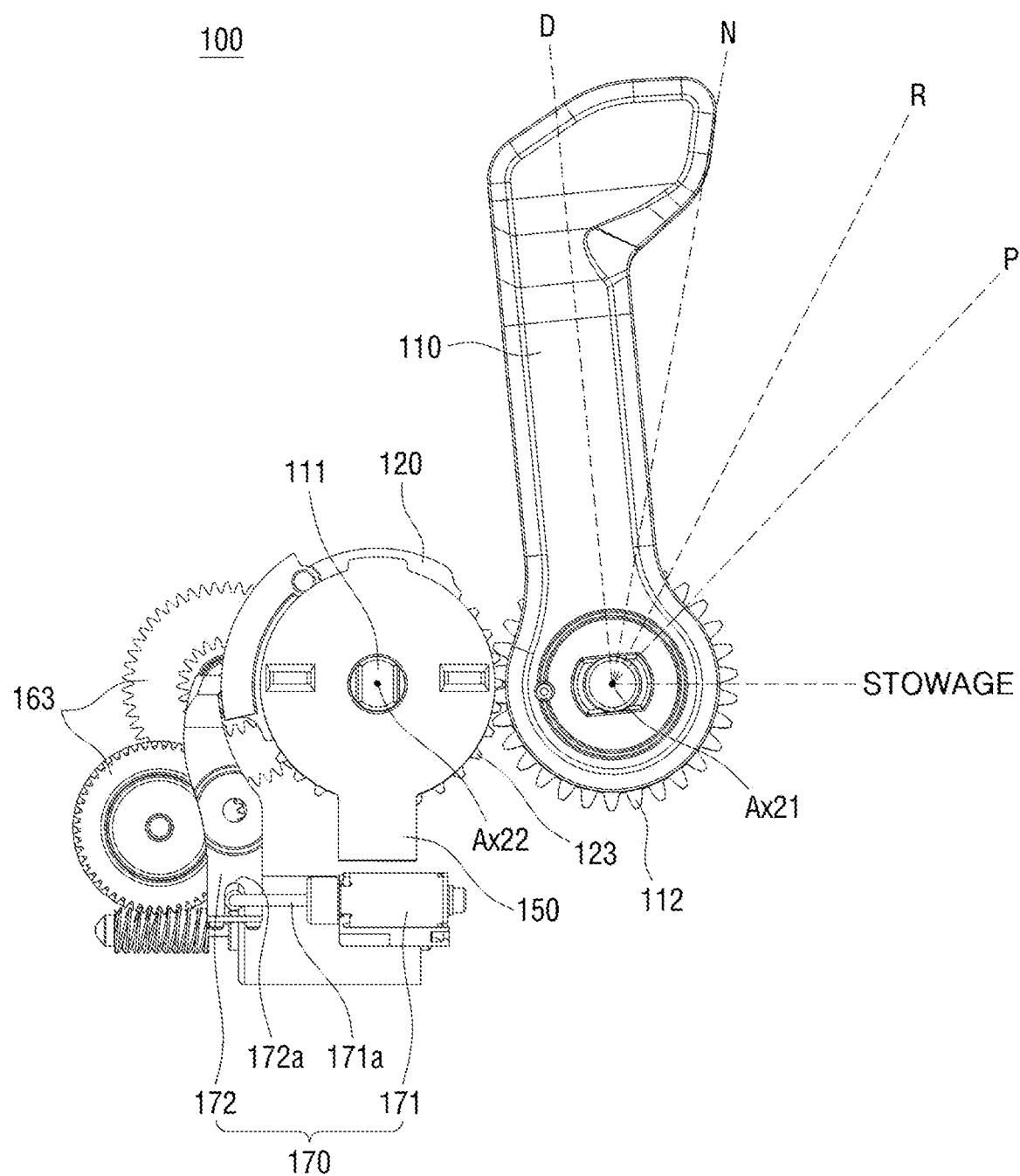
FIG. 23 is a side view of the automotive transmission according to an exemplary embodiment of the present disclosure.
Figure 24:
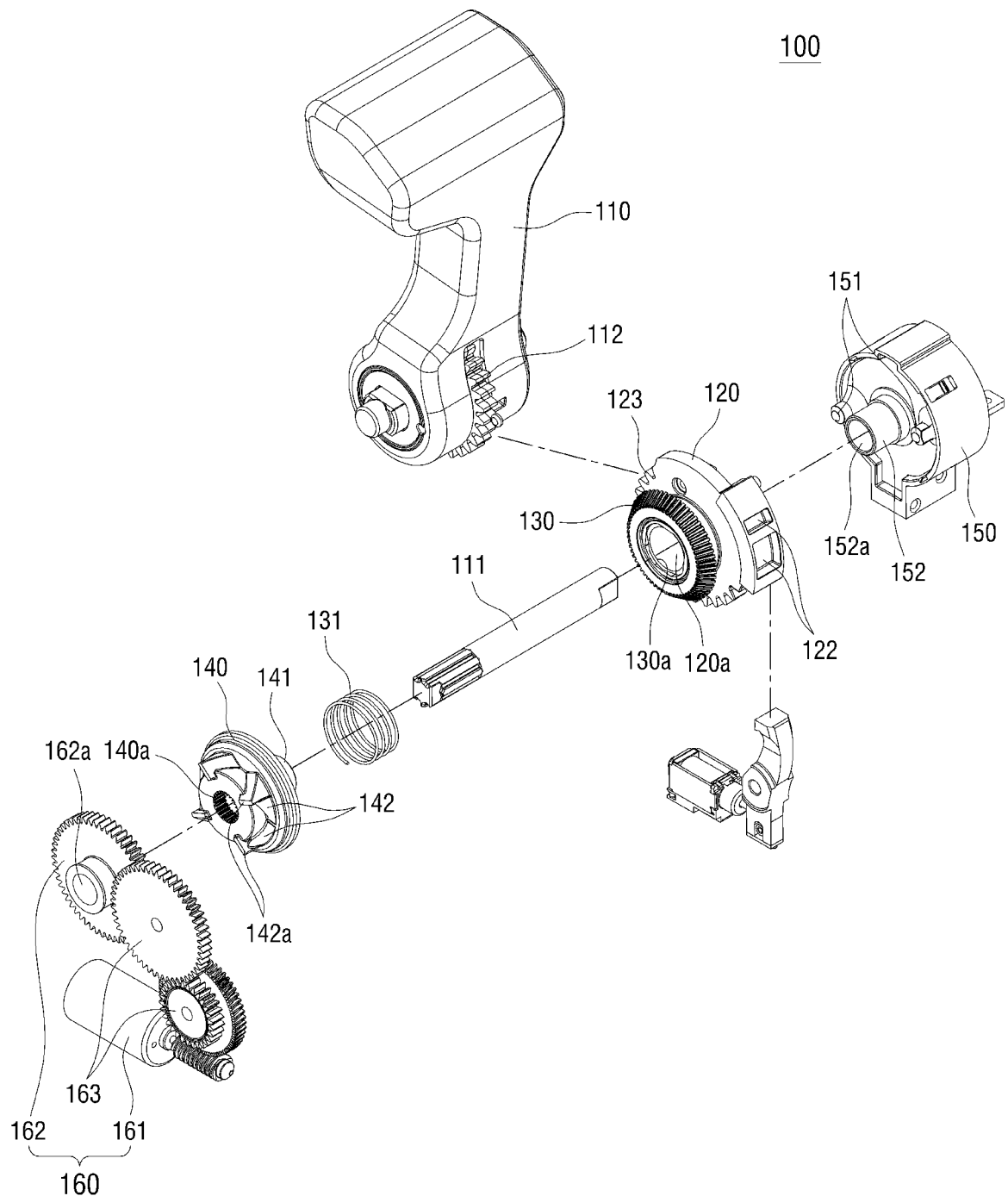
FIGS. 24 and 25 are exploded perspective views of the automotive transmission according to an exemplary embodiment of the present disclosure.
Figure 25:
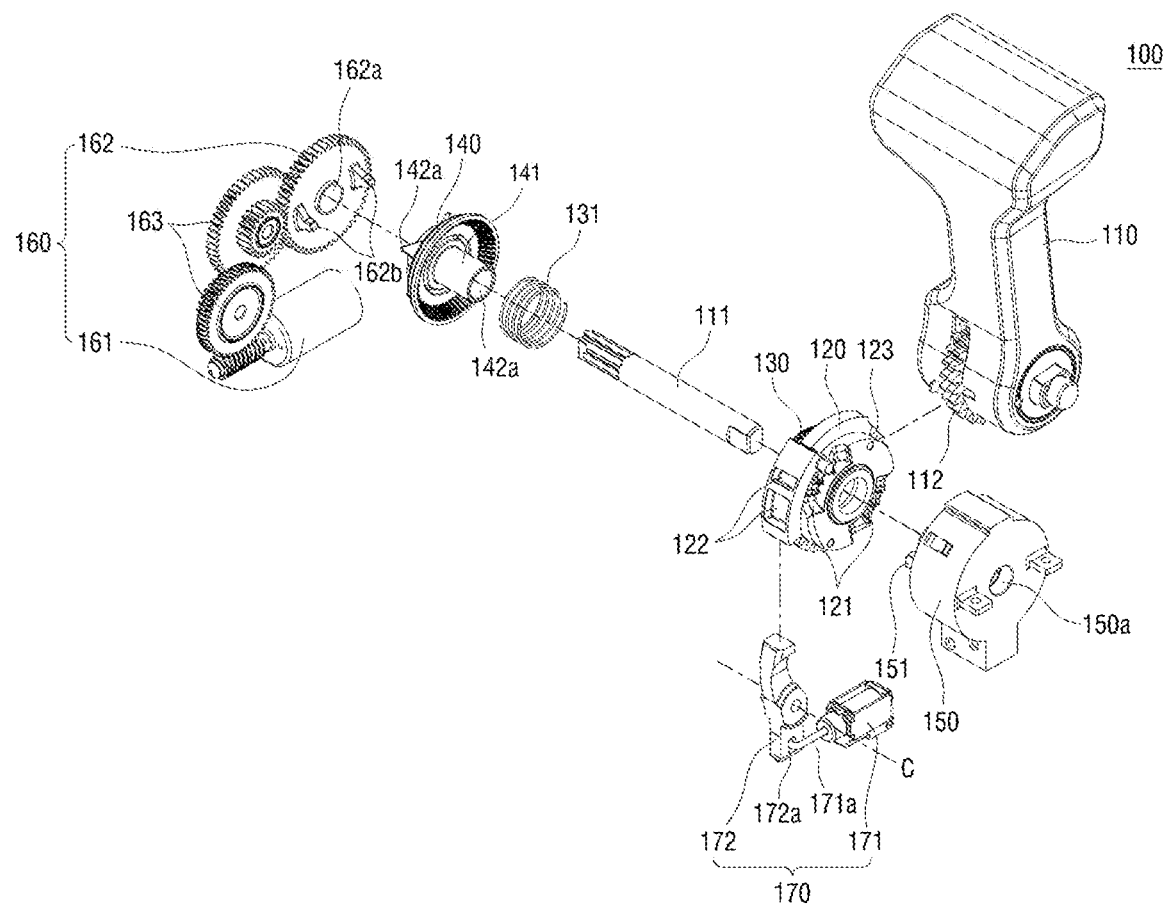

FIGS. 21 and 22 are perspective views of an automotive transmission according to an exemplary embodiment of the present disclosure, FIG. 23 is a side view of the automotive transmission according to an exemplary embodiment of the present disclosure, and FIGS. 24 and 25 are exploded perspective views of the automotive transmission according to an exemplary embodiment of the present disclosure. Referring to FIGS. 21 through 25, the automotive transmission 100 according to another exemplary embodiment of the present disclosure may include a gear shift lever 110, a rotation unit 120, a first gear unit 130, a second gear unit 140, a detent unit 150, a driving unit 160, and a locking unit 170, similar to the above-described exemplary embodiments.

In another exemplary embodiment of the present disclosure, the same reference numerals are used for elements having the same functions as those of the above-described exemplary embodiments, and a detailed description thereof will be omitted. Elements that use the same reference numerals as those of the above-described exemplary embodiments in another exemplary embodiment of the present disclosure will be understood to have substantially the same functions although there may be differences in positions, sizes and shapes.

In another exemplary embodiment of the present disclosure, the gear shift lever 110 and the rotation unit 120 may be rotated around different rotation axes Ax21 and Ax22, and in an example, the gear shift lever 110 and the rotation unit 120 may be rotated around the rotation axes Ax21 and Ax22 that are parallel to each other. In this case, since the rotation axes Ax21 and Ax22 of the gear shift lever 110 and the rotation unit 120 are spaced apart from each other, a rotational force of the gear shift lever 110 may require to be transferred to the rotation unit 120, or a rotational force of the rotation unit 120 may require to be transferred to the gear shift lever 110. Accordingly, in another exemplary embodiment of the present disclosure, the gear shift lever 110 and the rotation unit 120 may include transfer gears 112 and 123, which are engaged with each other, respectively.

In another exemplary embodiment of the present disclosure, since the gear shift lever 110 and the rotation unit 120 may transfer the rotational force therebetween using the transfer gears 112 and 123, unlike in the above-described exemplary embodiments, the gear shift lever 110 and the rotation unit 120 may be rotated in opposite directions. However, this is merely an example for aiding in understanding of the present disclosure, and the present disclosure is not limited thereto. The rotation directions of the gear shift lever 110 and the rotation unit 120 may be the same depending on the number and/or types of transfer gears.

Further, in another exemplary embodiment of the present disclosure, the rotation axes Ax21 and Ax22 of the gear shift lever 110 and the rotation unit 120 may be parallel to each other. However, the present disclosure is not limited thereto, and the gear shift lever 110 and the rotation unit 120 may not be parallel to each other depending on a structure for transferring a rotational force between the gear shift lever 110 and the rotation unit 120. As in another exemplary embodiment of the present disclosure, when the rotation axes Ax21 and Ax22 of the gear shift lever 110 and the rotation unit 120 are different from each other and the rotational force therebetween is transferred by the transfer gears 112 and 123, replacement or repair of the gear shift lever 110 may be more easily performed.

Moreover, in the above-described exemplary embodiments, the guide part 142 may be formed in the second gear unit 140, the protrusion 162b may be formed at the driving gear 162, and the protrusion 162b may be disposed at a first side or a second side of the guide part 142 based on the rotation of the driving gear 162 to cause the second gear unit 140 to be coupled to the first gear unit 130 or to be separated from the first gear unit 130. However, the present disclosure is not limited thereto.

Figure 26:
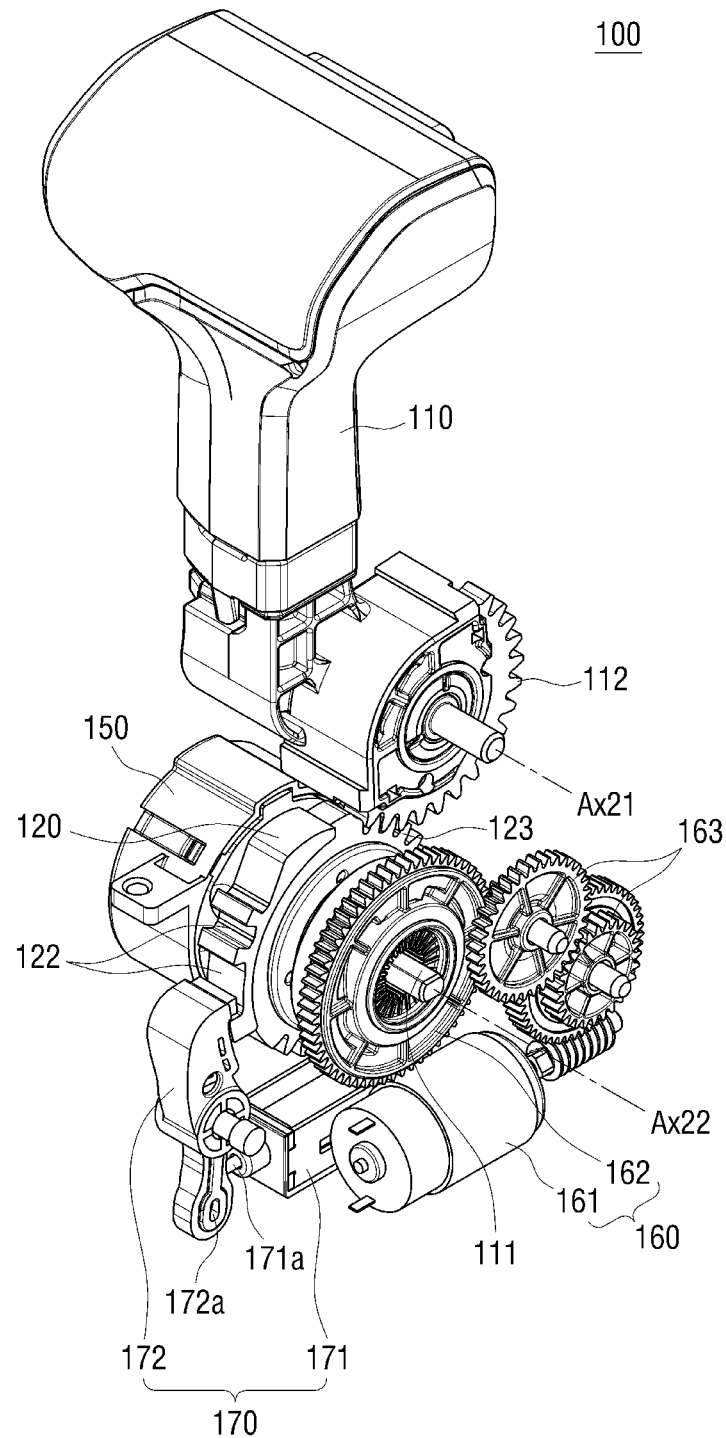
FIGS. 26 and 27 are perspective views of an automotive transmission according to an exemplary embodiment of the present disclosure.
Figure 27:
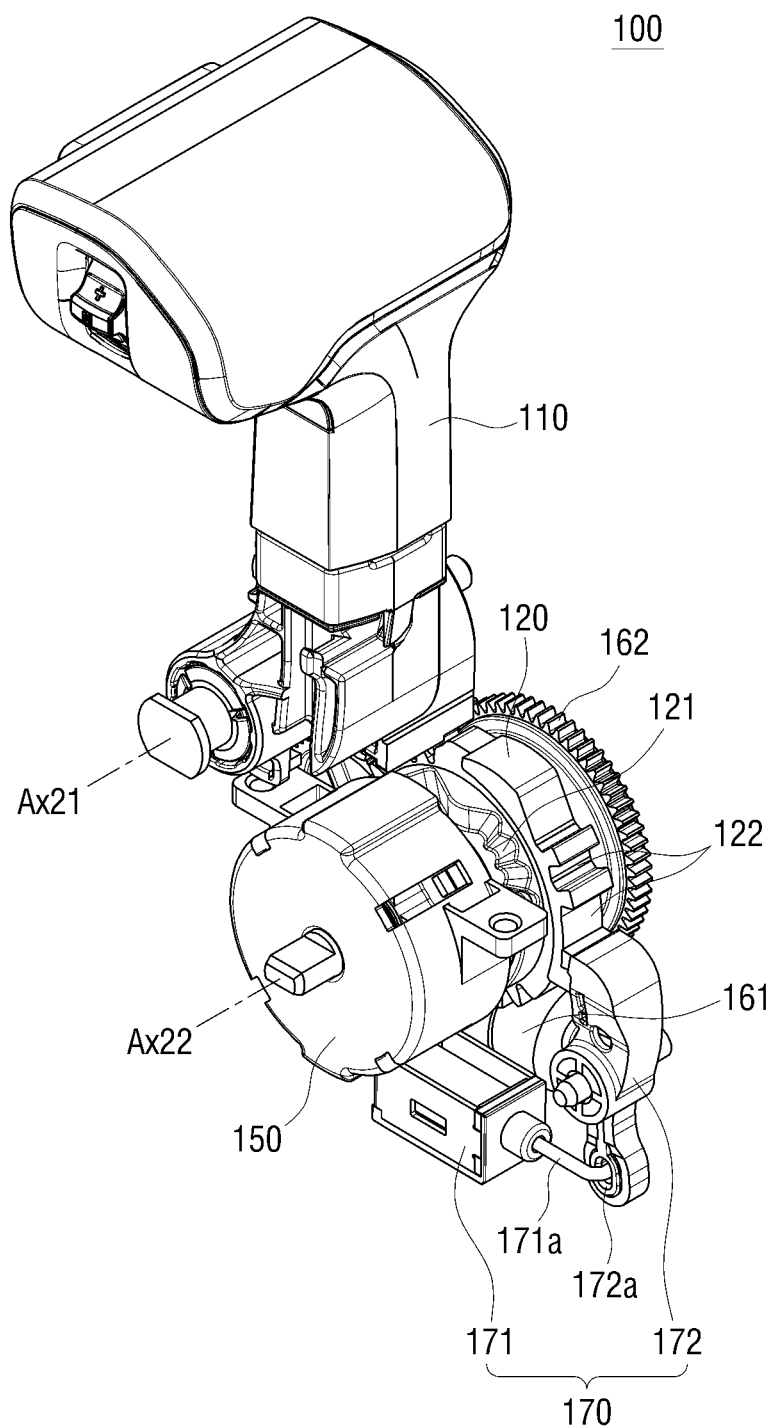
Figure 28:
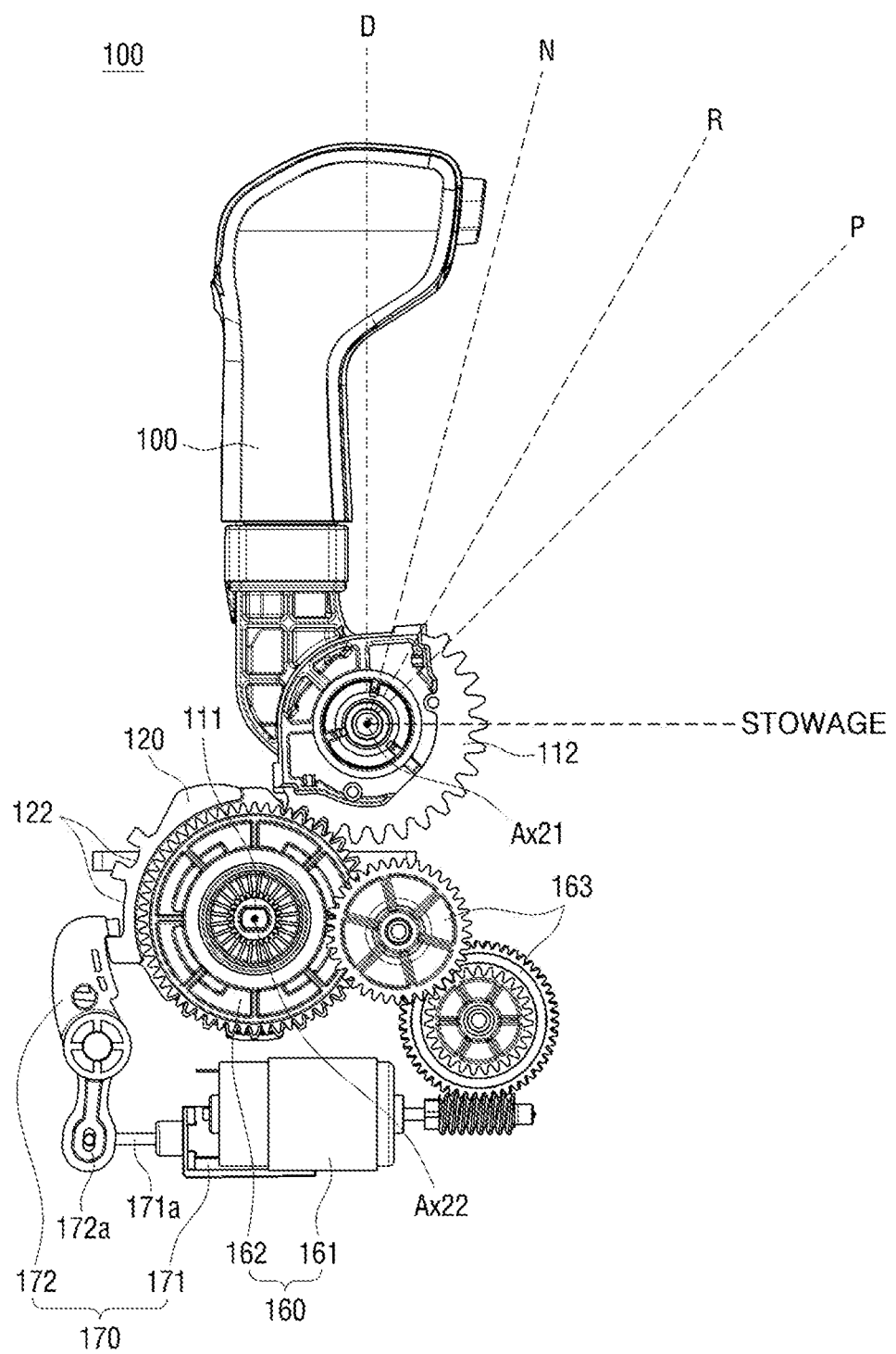
FIG. 28 is a side view of the automotive transmission according to an exemplary embodiment of the present disclosure.
Figure 29:
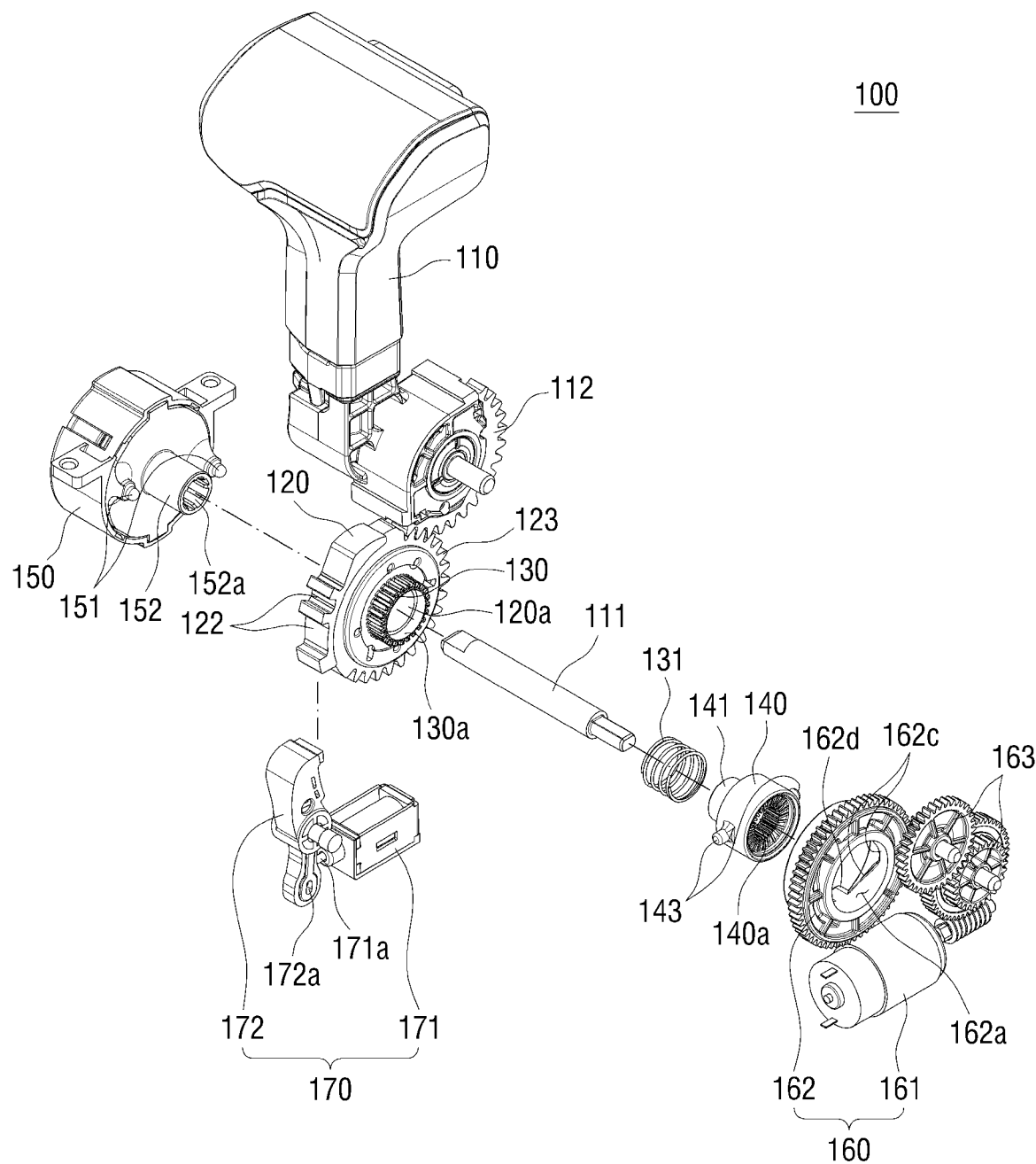
FIGS. 29 and 30 are exploded perspective views of the automotive transmission according to an exemplary embodiment of the present disclosure.
Figure 30:
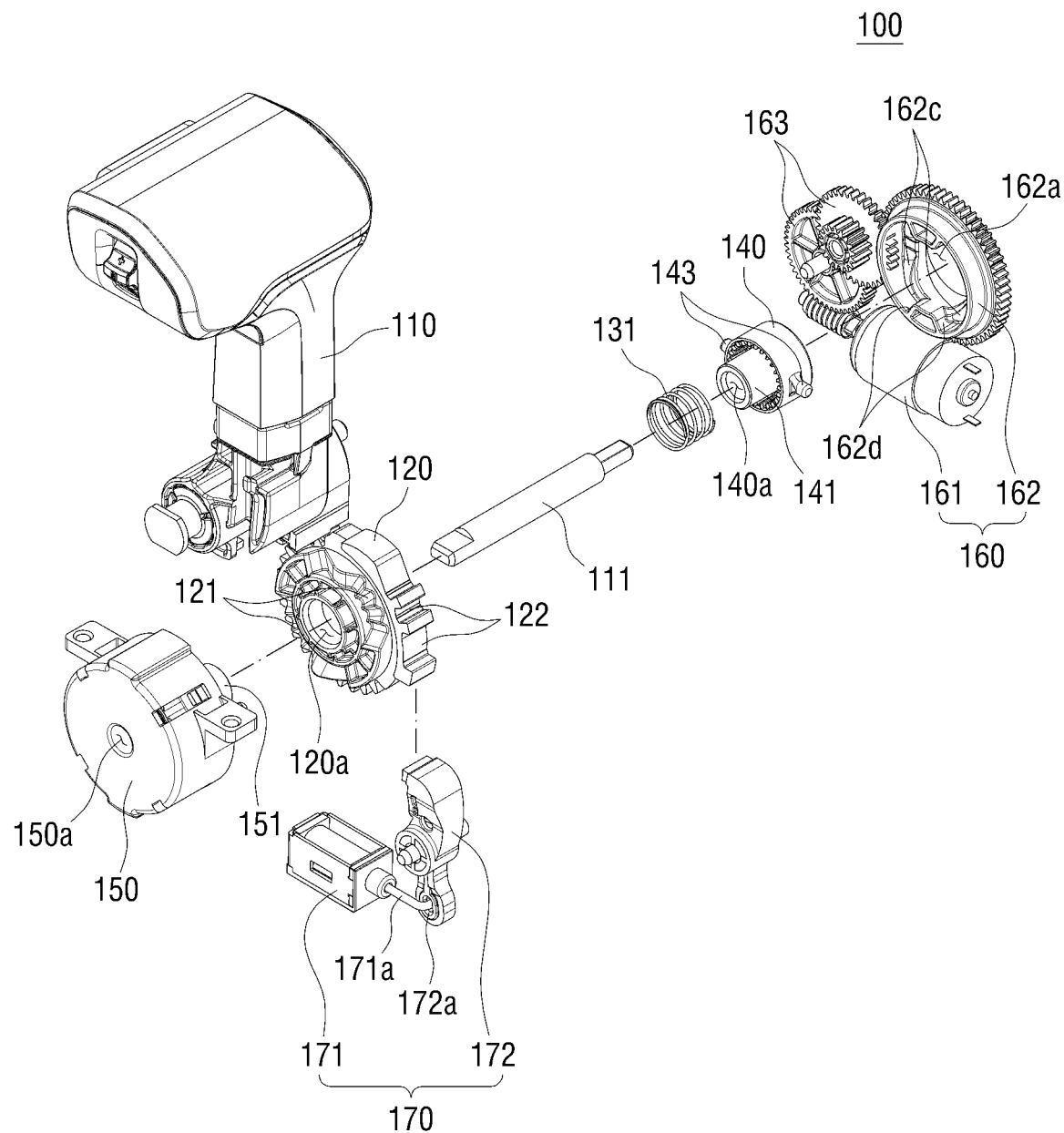

FIGS. 26 and 27 are perspective views of an automotive transmission according to an exemplary embodiment of the present disclosure, FIG. 28 is a side view of the automotive transmission according to an exemplary embodiment of the present disclosure, and FIGS. 29 and 30 are exploded perspective views of the automotive transmission according to an exemplary embodiment of the present disclosure. Referring to FIGS. 26 through 30, an automotive transmission 100 according to another exemplary embodiment of the present disclosure may include a gear shift lever 110, a rotation unit 120, a first gear unit 130, a second gear unit 140, a detent unit 150, a driving unit 160, and a locking unit 170, like in the above-described exemplary embodiments. In another exemplary embodiment of the present disclosure, the gear shift lever 110 and the rotation unit 120 may be rotated around different rotation axes Ax21 and Ax22, as in FIGS. 21 through 23 described above. However, the present disclosure is not limited thereto, and the gear shift lever 110 and the rotation unit 120 may also be rotated around the same rotation axis Ax, as in FIGS. 1 through 5 described above.

In another exemplary embodiment of the present disclosure, the same reference numerals are used for elements having substantially the same functions as those of the above-described exemplary embodiments, and a detailed description thereof will be omitted. Elements that use the same reference numerals as those of the above-described exemplary embodiments in another exemplary embodiment of the present disclosure will be understood to have substantially the same functions although there may be differences in positions, sizes and shapes.

Meanwhile, in another exemplary embodiment of the present disclosure, the second gear unit 140 may include at least one protrusion 143 that protrudes from an outside surface of the second gear unit 140 in a radial direction based on the rotation axis Ax22 of the rotation unit 120, and the driving gear 162 may include a guide part 162c formed on a surface that faces the second gear unit 140 along a rotation path of the protrusion 143. In another exemplary embodiment of the present disclosure, the protrusion 143 may be formed to protrude from the outside surface of the second gear unit 140 in the radial direction. However, the present disclosure is not limited thereto, and the protrusion 143 may also be formed to protrude toward the driving gear 162 as in the above-described embodiments.

The guide part 162c may be formed so that a surface that the protrusion 143 abuts protrudes toward the protrusion 143 from a first side at which the protrusion 143 enters to a second side, and a height of the surface may increase to allow the guide part 162c to guide the movement of the second gear unit 140. In this case, the guide parts 162c may be also formed in different (e.g., both) directions so that, when the driving gear 162 is rotated in a different direction, the protrusion height may be also increased from the first side, at which the protrusion 143 enters, to the second side. The guide parts 162c may be formed in both directions so that, even when the driving gears 162 are moved in different directions, the second gear unit 140 may be movable.

A blocking part 162d that blocks movement of the protrusion 143 may be formed at the second side of the guide part 162c. Thus, when the protrusion 143 enters from the first side of the guide part 162c and abuts the blocking part 162d formed at the second side of the guide part 162c due to the rotation of the driving gear 162, the second gear unit 140 may be rotated together with the driving gear 162 when the driving gear 162 is rotated.

Figure 31:
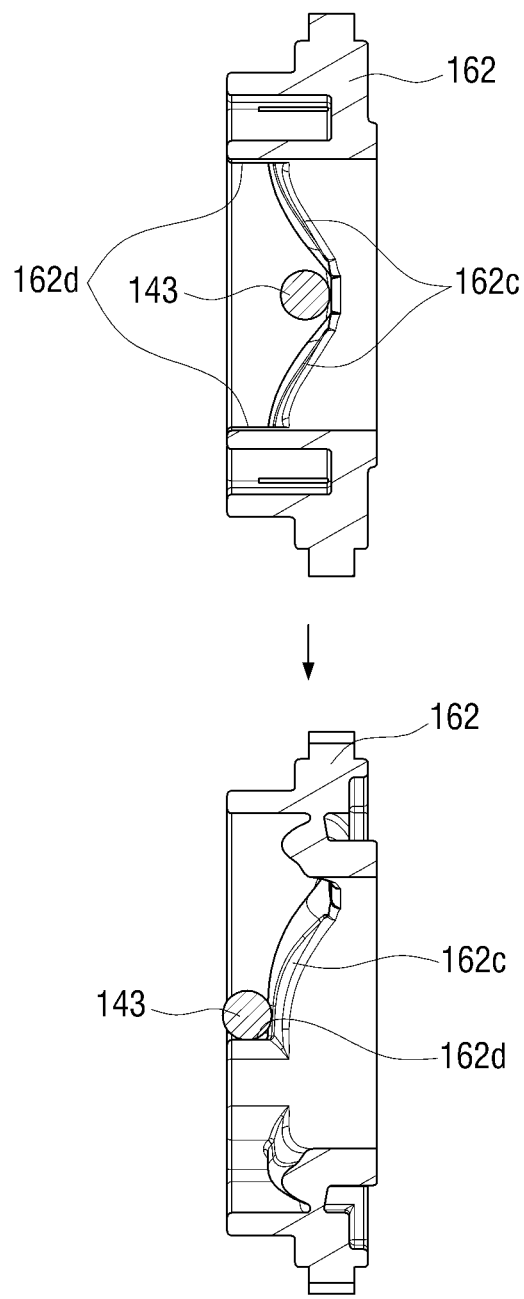
FIG. 31 is a schematic view of a protrusion having a varying position of a guide part based on rotation of a driving gear according to an exemplary embodiment of the present disclosure.
Figure 32:
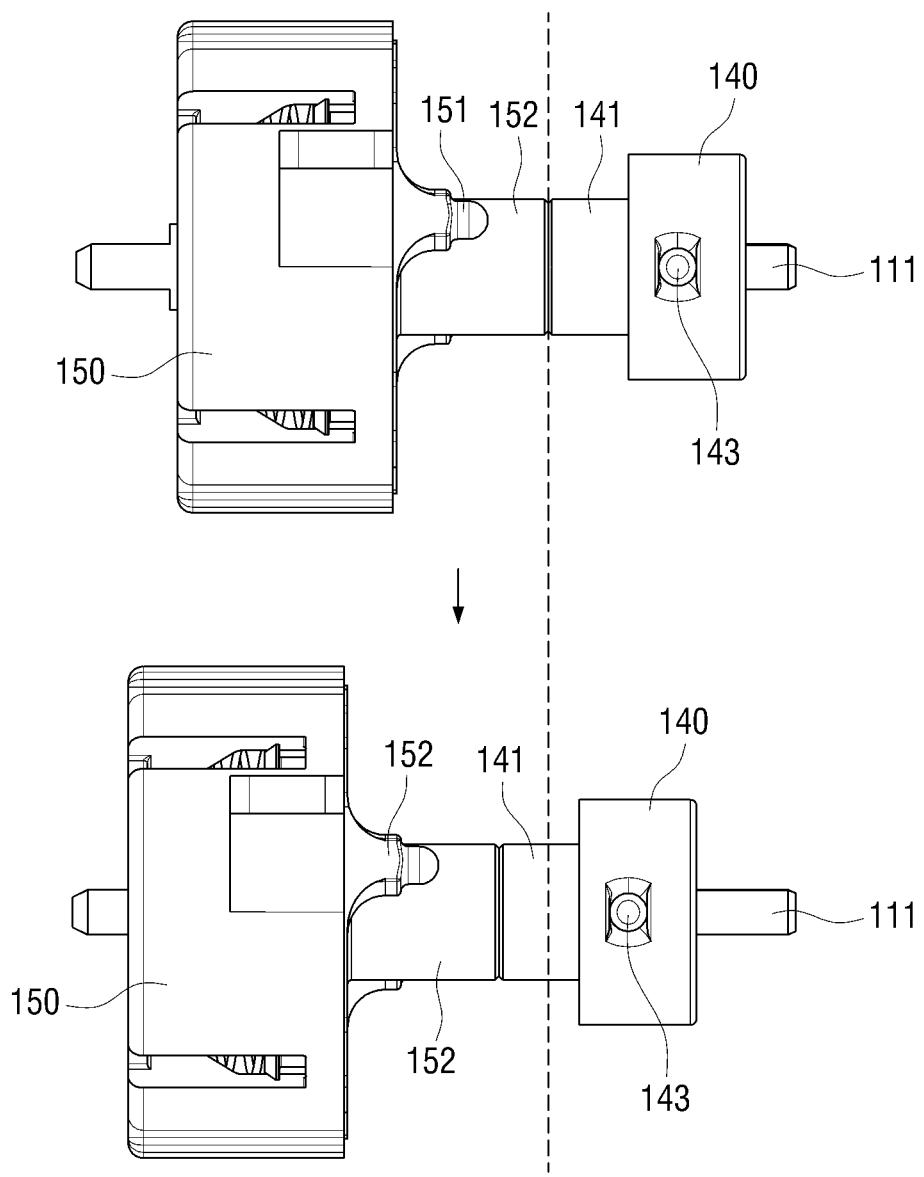
FIGS. 32 and 33 are schematic views of a position of a detent unit having a varying position based on rotation of the driving gear according to an exemplary embodiment of the present disclosure.
Figure 33:
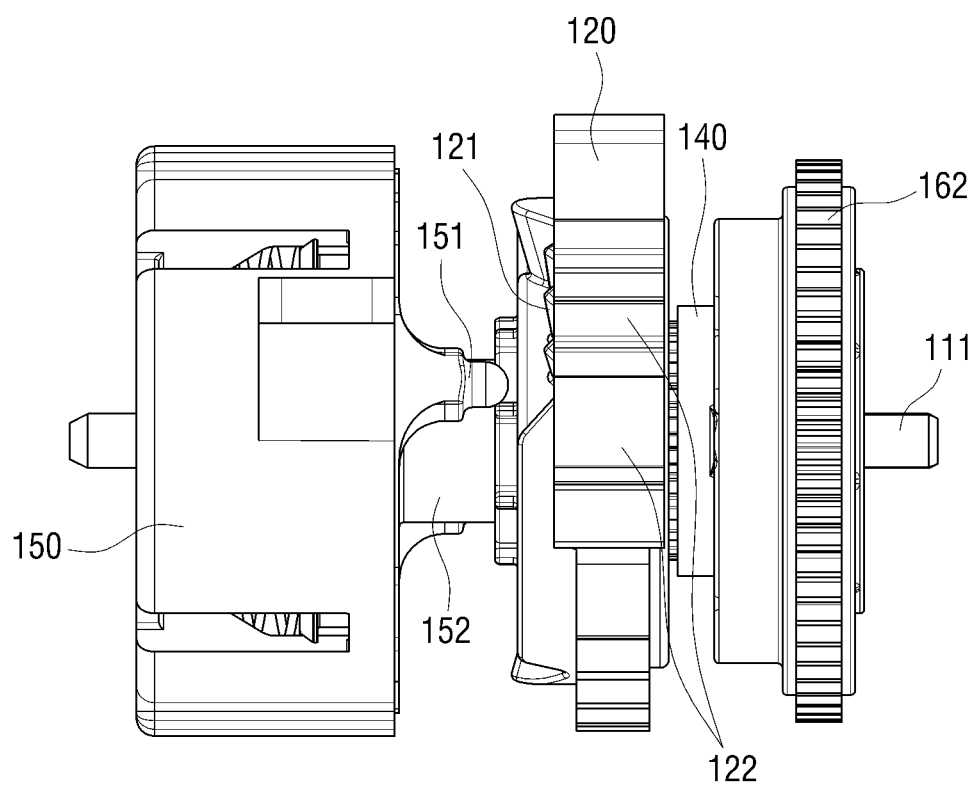

In this case, when the protrusion 143 is moved from the first side of the guide part 162c to the second side thereof due to the rotation of the driving gear 162, as shown in FIG. 31, the protrusion height of the guide part 162c may be increased to cause a force to be applied to the second gear unit 140 in a direction toward the detent unit 150, and the second gear unit 140 may be displaced in a direction in which the second gear unit 140 is coupled to the first gear unit 130, and a point A, where adjacent ends of a first extension part 141 and a second extension part 152 abut each other, may be displaced toward the detent unit 150, as shown in FIG. 32, and bullet 151 may be spaced apart from the detent groove 121, as shown in FIG. 33.

Accordingly, when the bullet 151 is spaced apart from the detent groove 121 and the driving gear is rotated, as shown in FIG. 33 described above, due to the blocking part 162d, the rotational force of the driving gear 162 may be transferred to the rotation unit 120 via the second gear unit 140 and the first gear unit 130 to cause the gear shift lever 110 to be rotated and to return to the non-driving stage.

As described above, an automotive transmission according to exemplary embodiments of the present disclosure may have one or more effects described below. When a gear shift lever returns to a non-driving stage from a driving stage, the occurrence of unnecessary handling feedback may be prevented to decrease noise or abrasion. Further, separate structures for generating handling feedback of the shift lever and returning of the shift lever may not be required so that the structure of the automotive transmission can be simplified.

The effects of the present discourse are not limited to the above-described effects, and other unmentioned effects will be clearly understood from the claims by those skilled in the art.

While the embodiments of the present disclosure have been described above, these are merely examples. It will be apparent to those skilled in the art that various modifications may be made to the above-described exemplary embodiments of the present disclosure without departing from the spirit or scope of the disclosure. Thus, it is intended that the present disclosure covers all such modifications, provided they fall within the scope of the appended claims and their equivalents.

What is claimed is:

1. An automotive transmission comprising:
   a gear shift lever;
   a rotation unit configured to rotate together with the gear shift lever;
   a first gear unit placed at a first side of the rotation unit to be rotated around a rotation axis of the rotation unit together with the rotation unit;
   a second gear unit configured to switch between a coupled position, at which the second gear unit is coupled to the first gear unit, and a separated position, at which the second gear unit is separated from the first gear unit;
   a driving unit configured to change a position of the second gear unit and selectively provide a driving force to the second gear unit; and
   a detent unit for generating a handling feedback, wherein a position of the detent unit is configured to be changed based on the position of the second gear unit, wherein at least one detent groove is formed at a second side of the rotation unit, and wherein when the second gear unit is at the coupled position with the first gear unit, the second gear unit is configured to change the position of the detent unit such that the detent unit is spaced apart from the detent groove of the rotation unit.

2. The automotive transmission of claim 1, wherein the second gear unit is rotated around a same rotation axis as the first gear unit.

3. The automotive transmission of claim 1, wherein one of the first gear unit or the second gear unit includes an external gear, and the other of the first gear unit or the second gear unit includes an internal gear to be engaged with the external gear.

4. The automotive transmission of claim 1, wherein the first gear unit and the second gear unit are elastically supported by an elastic member that is elastically deformed based on the position of the second gear unit.

5. The automotive transmission of claim 1, wherein when the second gear unit is at the separated position from the first gear unit, the second gear unit is configured to change the position of the detent unit such that the detent unit is engaged with the detent groove of the rotation unit.

6. The automotive transmission of claim 1, wherein the detent unit includes at least one bullet that abuts the detent groove formed at the second side of the rotation unit in a rotation direction of the rotation unit, and the position of the detent unit is changed to cause the bullet to abut or to be spaced apart from the detent groove based on the position of the second gear unit.

7. The automotive transmission of claim 6, wherein the second gear unit includes a first extension part that extends toward the detent unit, the detent unit includes a second extension part that extends toward the second gear unit, and adjacent ends of the first extension part and the second extension part abut each other at a predetermined point between the second gear unit and the detent unit.

8. The automotive transmission of claim 7, wherein the first extension part changes the position of the detent unit when the second gear unit is displaced in a direction in which the second gear unit is coupled to the first gear unit by applying force to the second extension part to cause the bullet to be spaced apart from the detent groove.

9. The automotive transmission of claim 6, wherein the position of the detent unit is changed when the second gear unit is displaced in a direction in which the second gear unit is separated from the first gear unit to cause the bullet to abut the detent groove.

10. The automotive transmission of claim 1, wherein the driving unit changes the position of the second gear unit to allow the second gear unit to be coupled to the first gear unit when return conditions to a non-driving stage position from a driving stage position are satisfied.

11. The automotive transmission of claim 10, wherein the non-driving stage position comprises at least one among a parking stage position and a stowage position, the stowage position being a position in which the gear shift lever is stowed in a stowage space.

12. The automotive transmission of claim 10, wherein the driving unit comprises:

an actuator; and a driving gear that is configured to be rotated around a same rotation axis as the second gear unit due to a driving force provided from the actuator, wherein a protrusion is formed at one of the driving gear or the second gear unit, and a guide part for moving the protrusion is formed at the other of the driving gear or the second gear unit.

13. The automotive transmission of claim 12, wherein the guide part is formed so that a protruding height is increased along a rotation path of the protrusion in a direction toward the protrusion from a first side, at which the protrusion enters, to a second side.

14. The automotive transmission of claim 13, wherein, when the driving gear is rotated in a first direction, the protrusion is moved to the second side from the first side of the guide part to cause the second gear unit to be displaced in a direction in which the second gear unit is coupled to the first gear unit, and when the driving gear is rotated in a second direction, the protrusion is moved to the first side from the second side of the guide part to cause the second gear unit to be displaced in a direction in which the second gear unit is separated from the first gear unit.

15. The automotive transmission of claim 14, wherein the guide part includes a blocking part formed at the second side of the guide part and configured to block movement of the protrusion, and the second gear unit is rotated together with the driving gear with the protrusion in contact with the blocking part to rotate the gear shift lever.

16. The automotive transmission of claim 13, wherein the guide part includes an insertion groove into which a part of the protrusion is inserted.

17. The automotive transmission of claim 1, further comprising:

a locking unit configured to confine or release rotation of the gear shift lever, wherein the locking unit includes an actuator and a locking rod rotated by the actuator and having one end inserted into at least one fixing groove formed along a circumference of the rotation unit.

* * * * *